United States Patent
Williams et al.

(10) Patent No.: US 11,113,448 B2
(45) Date of Patent: *Sep. 7, 2021

(54) PRESENTING VIEWS OF AN ELECTRONIC DOCUMENT

(71) Applicant: Qualtrics, LLC, Provo, UT (US)

(72) Inventors: Sterling Williams, Vineyard, UT (US); Jeffrey Scott Whiting, Salem, UT (US); Kyle James Seely, Lindon, UT (US); Jason R. Gardner, Pleasant Grove, UT (US); Cameron James Holiman, Orem, UT (US)

(73) Assignee: QUALTRICS, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,774

(22) Filed: Sep. 30, 2019

(65) Prior Publication Data
US 2020/0026748 A1    Jan. 23, 2020

Related U.S. Application Data

(63) Continuation of application No. 16/050,908, filed on Jul. 31, 2018, now Pat. No. 10,430,497, which is a continuation of application No. 14/841,357, filed on Aug. 31, 2015, now Pat. No. 10,049,085.

(51) Int. Cl.
*G06F 40/106* (2020.01)
*G06F 40/103* (2020.01)

(52) U.S. Cl.
CPC .......... *G06F 40/103* (2020.01); *G06F 40/106* (2020.01)

(58) Field of Classification Search
CPC ............................ G06F 40/103; G06F 40/106
See application file for complete search history.

(56) References Cited

U.S. PATENT DOCUMENTS

| 6,171,112 B1 | 1/2001 | Clark et al. |
| 6,189,029 B1 | 2/2001 | Fuerst |
| 6,272,506 B1 | 8/2001 | Bell |

(Continued)

OTHER PUBLICATIONS

Surveygizmo.com how to create accessible online form, Nov. 13, 2013, pp. 1-10 https://www.surveygizmo.com/survey-blog/creating-accessible-online-forms-everyone-benefits-from-a-well-designed-web-form/.*

(Continued)

*Primary Examiner* — Scott T Baderman
*Assistant Examiner* — Mario M Velez-Lopez
(74) *Attorney, Agent, or Firm* — Keller Jolley Preece

(57) ABSTRACT

Embodiments of the present disclosure relate to presenting and synchronizing views of electronic document. In particular, a view management system can synchronize and present multiple synchronized views of an electronic document for display on a client device. For example, the view management system can present multiple views of an electronic document and bind one or more of the views with a model. In response to detecting a user interaction with respect to a view, the view management system can cause a client device to apply the user interaction to each of multiple views (e.g., each view that is bound to the model). By synchronizing views, the view management system can enable a user to conveniently observe how one or more user interactions with respect to a view would appear across multiple views of an electronic document.

20 Claims, 13 Drawing Sheets

(56) References Cited

U.S. PATENT DOCUMENTS

| | | | |
|---|---|---|---|
| 7,103,835 B1 | 9/2006 | Yankovich et al. | |
| 7,306,148 B1 | 12/2007 | Morganstein | |
| 7,698,339 B2 | 4/2010 | Zhang et al. | |
| 7,849,101 B2 | 12/2010 | Lind et al. | |
| 7,934,098 B1 | 4/2011 | Hahn et al. | |
| 7,991,916 B2* | 8/2011 | Meek | G06F 9/541 709/248 |
| 8,051,145 B2 | 11/2011 | Wu et al. | |
| 8,229,915 B1 | 7/2012 | Lloyd et al. | |
| 8,239,755 B2 | 8/2012 | Maguire | |
| 8,538,062 B1 | 9/2013 | Herz | |
| 8,588,483 B2 | 11/2013 | Hicks et al. | |
| 8,745,075 B2 | 6/2014 | Gaucas et al. | |
| 8,868,570 B1 | 10/2014 | Skut et al. | |
| 8,949,352 B2* | 2/2015 | Lewis | G06F 16/9558 709/206 |
| 8,996,985 B1 | 3/2015 | Johnston et al. | |
| 9,069,768 B1 | 6/2015 | Sampson | |
| 9,119,156 B2 | 8/2015 | Green et al. | |
| 9,524,277 B2 | 12/2016 | Nekkalapudi | |
| 9,584,629 B2* | 2/2017 | Lerman | H04L 67/02 |
| 10,049,085 B2 | 8/2018 | Williams et al. | |
| 10,210,144 B2* | 2/2019 | Wan | G06F 40/154 |
| 10,460,019 B2* | 10/2019 | Balasubramanian | G06F 40/117 |
| 10,482,175 B2* | 11/2019 | Rosewell | G06F 16/325 |
| 10,671,806 B2* | 6/2020 | Tsabba | G06F 21/42 |
| 10,958,694 B2* | 3/2021 | Sandholm | H04W 4/02 |
| 2002/0138528 A1 | 9/2002 | Gong et al. | |
| 2003/0023641 A1 | 1/2003 | Gorman et al. | |
| 2003/0023953 A1* | 1/2003 | Lucassen | G06F 8/38 717/106 |
| 2003/0056100 A1 | 3/2003 | Beatson | |
| 2003/0101235 A1 | 5/2003 | Zhang | |
| 2003/0222910 A1 | 12/2003 | Guerrero | |
| 2006/0122889 A1 | 6/2006 | Burdick et al. | |
| 2006/0156216 A1 | 7/2006 | Chen et al. | |
| 2006/0282415 A1 | 12/2006 | Shibata et al. | |
| 2007/0208703 A1 | 9/2007 | Shi et al. | |
| 2007/0260475 A1 | 11/2007 | Bhanote | |
| 2007/0296805 A1 | 12/2007 | Tedenvall et al. | |
| 2008/0109715 A1 | 5/2008 | Stover | |
| 2009/0138798 A1 | 5/2009 | Fan et al. | |
| 2009/0187593 A1 | 7/2009 | Chen et al. | |
| 2009/0215478 A1 | 8/2009 | Leinonen et al. | |
| 2009/0249216 A1 | 10/2009 | Charka et al. | |
| 2010/0017704 A1 | 1/2010 | Jaffe et al. | |
| 2010/0161378 A1 | 6/2010 | Josifovski et al. | |
| 2010/0180192 A1 | 7/2010 | Hall | |
| 2010/0226564 A1 | 9/2010 | Marchesotti et al. | |
| 2010/0293598 A1 | 11/2010 | Collart et al. | |
| 2011/0054960 A1 | 3/2011 | Bhatia et al. | |
| 2011/0173589 A1 | 7/2011 | Guttman et al. | |
| 2011/0231226 A1 | 9/2011 | Golden | |
| 2012/0042102 A1 | 2/2012 | Chung et al. | |
| 2012/0089659 A1 | 4/2012 | Halevi et al. | |
| 2012/0203861 A1 | 8/2012 | Flack et al. | |
| 2012/0256944 A1 | 10/2012 | Crumly et al. | |
| 2012/0311140 A1 | 12/2012 | Kuroda et al. | |
| 2013/0014153 A1 | 1/2013 | Bhatia et al. | |
| 2013/0074196 A1 | 3/2013 | Richter et al. | |
| 2013/0132817 A1 | 5/2013 | Sharad et al. | |
| 2013/0174012 A1* | 7/2013 | Kwan | G06F 16/958 715/234 |
| 2013/0187926 A1 | 7/2013 | Silverstein et al. | |
| 2013/0326333 A1 | 12/2013 | Hashmi | |
| 2013/0326337 A1 | 12/2013 | Lehmann et al. | |
| 2013/0326406 A1 | 12/2013 | Reiley et al. | |
| 2014/0012676 A1 | 1/2014 | Forte | |
| 2014/0079297 A1 | 3/2014 | Tadayon et al. | |
| 2014/0214535 A1 | 7/2014 | Kee et al. | |
| 2014/0258830 A1 | 9/2014 | Gormish | |
| 2014/0310582 A1 | 10/2014 | Bardman | |
| 2014/0351268 A1 | 11/2014 | Weskamp et al. | |
| 2015/0012812 A1 | 1/2015 | Wu et al. | |
| 2015/0033310 A1 | 1/2015 | Chen et al. | |
| 2015/0035959 A1 | 2/2015 | Amble et al. | |
| 2015/0154660 A1 | 6/2015 | Weald et al. | |
| 2015/0193794 A1 | 7/2015 | Douglas et al. | |
| 2015/0243181 A1 | 8/2015 | Somasundaran et al. | |
| 2015/0248676 A1 | 9/2015 | Vaidyanathan et al. | |
| 2015/0334121 A1 | 11/2015 | Hernberg | |
| 2016/0044071 A1 | 2/2016 | Sandholm | |
| 2016/0103800 A1 | 4/2016 | Girault et al. | |
| 2016/0212178 A1* | 7/2016 | Zhang | H04L 65/1066 |
| 2016/0266881 A1 | 9/2016 | Thompson et al. | |
| 2016/0364201 A1 | 12/2016 | Beveridge et al. | |
| 2018/0089412 A1 | 3/2018 | Kopikare et al. | |
| 2018/0122256 A1 | 5/2018 | Smith et al. | |
| 2018/0341626 A1 | 11/2018 | Williams et al. | |
| 2019/0139282 A1 | 5/2019 | Rathore et al. | |

OTHER PUBLICATIONS

Emmet LiveStyle: installation and usage, Jul. 25, 2013, pp. 1-3, https://github.com/sergeche/livestyle/blob/master/INSTALLATION.md.

Html5rocks.com, "Synchronized Cross-device Mobile Testing", Jan. 4, 2014, pp. 1-25 https://www.html5rocks.com/en/tutorials/tooling/synchronized-cross-device-testing/.

Smashingmagazine.com,"Review of Cross-Browser Testing Tools" published Aug. 7, 2011 and as available on Jul. 27, 2015, pp. 1-13 http://www.smashingmagazine.com:80/2011/08/a-dozen-cross-browser-testing-tools/.

Survey Monkey online survey generator, 1999 as evidenced by youtube video available online at https://www.youtube.com/watch?v =OLK5a4y0Lmo, published Dec. 12, 2015).

U.S. Appl. No. 14/841,357, Jun. 23, 2017, Office Action.
U.S. Appl. No. 14/841,357, Dec. 1, 2017, Office Action.
U.S. Appl. No. 14/841,357, Apr. 12, 2018, Notice of Allowance.
U.S. Appl. No. 15/339,169, Jun. 4, 2018, Office Action.
U.S. Appl. No. 15/339,169, Feb. 15, 2019, Office Action.
U.S. Appl. No. 15/339,169, Oct. 18, 2019, Office Action.
U.S. Appl. No. 15/274,786, Jan. 11, 2018, Office Action.
U.S. Appl. No. 15/274,786, Jun. 28, 2018, Office Action.
U.S. Appl. No. 15/274,786, Jan. 28, 2019, Office Action.
U.S. Appl. No. 15/274,786, Aug. 8, 2019, Notice of Allowance.
U.S. Appl. No. 16/050,908, Oct. 19, 2018, Office Action.
U.S. Appl. No. 16/050,908, Feb. 4, 2019, Office Action.
U.S. Appl. No. 16/050,908, May 23, 2019, Notice of Allowance.
U.S. Appl. No. 15/339,169, Mar. 12, 2020, Notice of Allowance.
U.S. Appl. No. 16/921,631, Sep. 23, 2020, Notice of Allowance.
U.S. Appl. No. 16/730,521, Sep. 25, 2020, Office Action.
U.S. Appl. No. 16/730,521, Jan. 22, 2021, Notice of Allowance.

* cited by examiner

PRESENTING VIEWS OF AN ELECTRONIC DOCUMENT

CROSS REFERENCE TO RELATED APPLICATIONS

The present application is a continuation of U.S. application Ser. No. 16/050,908, filed Jul. 31, 2018, which is a continuation of U.S. application Ser. No. 14/841,357, filed Aug. 31, 2015 which issued as U.S. Pat. No. 10,049,085. The aforementioned application is hereby incorporated by reference in its entirety.

BACKGROUND

1. Technical Field

One or more embodiments of the present disclosure relate generally to systems and methods for presenting views of electronic content. More specifically, one or more disclosed embodiments relate to systems and methods for presenting and synchronizing different views of an electronic document.

2. Background and Relevant Art

The Internet is an increasingly popular mechanism for delivering electronic content. For example, companies often provide various types of electronic documents to users over the Internet. Additionally, as the number of different types of electronic devices having Internet capabilities increases, users access more and more electronic content using electronic devices having different display features (e.g., monitor/screen sizes). While the increased availability of electronic devices can facilitate convenient access to online electronic content, a number of problems currently exist in presenting electronic content via electronic devices having different display capabilities.

As an initial problem, while the increase in the number of electronic devices having Internet access increases the convenience of accessing electronic content, the presentation of the electronic content often fails to translate between electronic devices having different display features. For example, while an electronic document can display correctly on a monitor of a desktop computer, the same electronic document may fail to display correctly a display screen of a mobile device (e.g., the electronic document size does not fit, misaligned formatting, etc.). Often, in an attempt to correctly display the electronic document on a display screen of a mobile device, a mobile device dramatically decreases the size of text within the electronic document, resulting in reduced readability of the electronic document for a user. As such, mobile devices, as well as other devices having a limited display area, often fail to provide a user-friendly presentation of electronic content.

In addition to inadequacies in presenting electronic content on mobile devices (and other electronic devices having limited display areas), conventional systems often fail to enable a user to view how electronic content reacts to one or more user interactions when presented on different types of electronic devices. For instance, a user interaction with respect to electronic content on one electronic device can provide an acceptable presentation reaction, while the same user interaction with respect to the electronic content presented on a different electronic device can cause a poor presentation reaction. With many conventional systems, a provider of electronic content often has to test or perform the same user interaction on the same electronic content using various different electronic devices. Further, the number of different types of electronic devices on which users will view the electronic content is every increasing. Thus, testing user interactions on different electronic devices often becomes time-consuming, expensive, and generally impractical.

As an alternative to testing user interactions with the same electronic content on different electronic devices, many conventional systems provide different versions of electronic content for different respective devices. For example, some conventional systems provide a desktop version of electronic content for display on a desktop computer and a mobile version of the electronic content for display on a mobile device. Nevertheless, generating and providing different versions of electronic content for different devices can become a burdensome process as individual versions of digital content are created for different operating systems, different devices, and/or different applications. Furthermore, as the variety of mobile devices and other electronic devices continues to increase, creating different electronic content for presentation on each different type of electronic device can become time-consuming, expensive, and generally impractical.

Accordingly, these and other disadvantages exist with respect to conventional systems and methods for presenting various views of electronic content.

SUMMARY

Embodiments of the present disclosure provide benefits and/or solve one or more of the foregoing or other problems in the art with systems and methods for presenting multiple views of electronic content. For example, the systems and methods disclosed herein provide a presentation of multiple views of an electronic document to a user in accordance with a document model. For instance, the systems and methods simultaneously provide a first view of an electronic document (e.g., a desktop view) and a second view of the electronic document (e.g., a mobile device view). Further, the systems and methods can synchronize the presentation of the multiple views of an electronic document in response to a user providing a user interaction with respect to one of the multiple views. For example, a user can provide a user interaction with respect to a first view of an electronic document, and the systems and methods disclosed herein cause both the first view and one or more additional views of the electronic document to react to the particular user interaction.

To illustrate, example embodiments of the systems and methods may enable a client device to provide multiple views of an electronic document to a user. Each of the multiple views can correspond to different display capabilities (e.g., different display areas and/or different client device display capabilities). For example, example systems and methods include providing a user with a desktop view of an electronic document and a mobile view of the electronic document, at the same time. For instance, in one or more embodiments, the systems and methods can cause the client device to provide multiple views of the same electronic document within a single graphical user interface. As such, the systems and methods can present a user with different views of an electronic document to visually illustrate how the electronic document would appear on different client devices with different display capabilities.

Additionally, in one or more embodiments, the systems and methods synchronize multiple views of an electronic document to reflect one or more user interactions that a user provides with respect to a particular view of the electronic document. In particular, example embodiments of the systems and methods can bind a document model to the multiple views of the electronic document. Based on detecting a user interaction with respect to a particular document view, the systems and methods can update the document model. Using the updated document model, the systems and methods synchronize the other views of the electronic document, that are bound to the document model, to reflect the detected user interaction. As such, the systems and methods can conveniently present different views of an electronic document to illustrate how a user interaction with respect to one view would be applied to one or more additional views. In this way, the systems and methods disclosed herein allow a user to easily and efficiently test and preview the effect of one or more user interactions with an electronic document on multiple different types of client devices, while also avoiding time-consuming and expensive testing on individual client devices.

Furthermore, the systems and methods described herein can provide, on a single client device, multiple views of the same electronic document with each of the multiple views taking into account the different display capabilities of any number of different types of client devices. For example, in one or more embodiments, the systems and methods can simultaneously provide multiple views of an electronic document within different portions of a graphical user interface. Further, in one or more additional or alternative embodiments, the systems and methods can simultaneously provide synchronized views on different client devices. Thus, the systems and methods described herein can enable one or multiple client devices to simultaneously provide synchronized views of the same electronic document within display area(s) of the same or different client devices, and as such, allow a user to easily and efficiently preview an electronic document to be distributed to a variety of different client devices to ensure that each client device presents the electronic document at an acceptable level of quality and functionality.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which.

DETAILED DESCRIPTION

Figure 1:
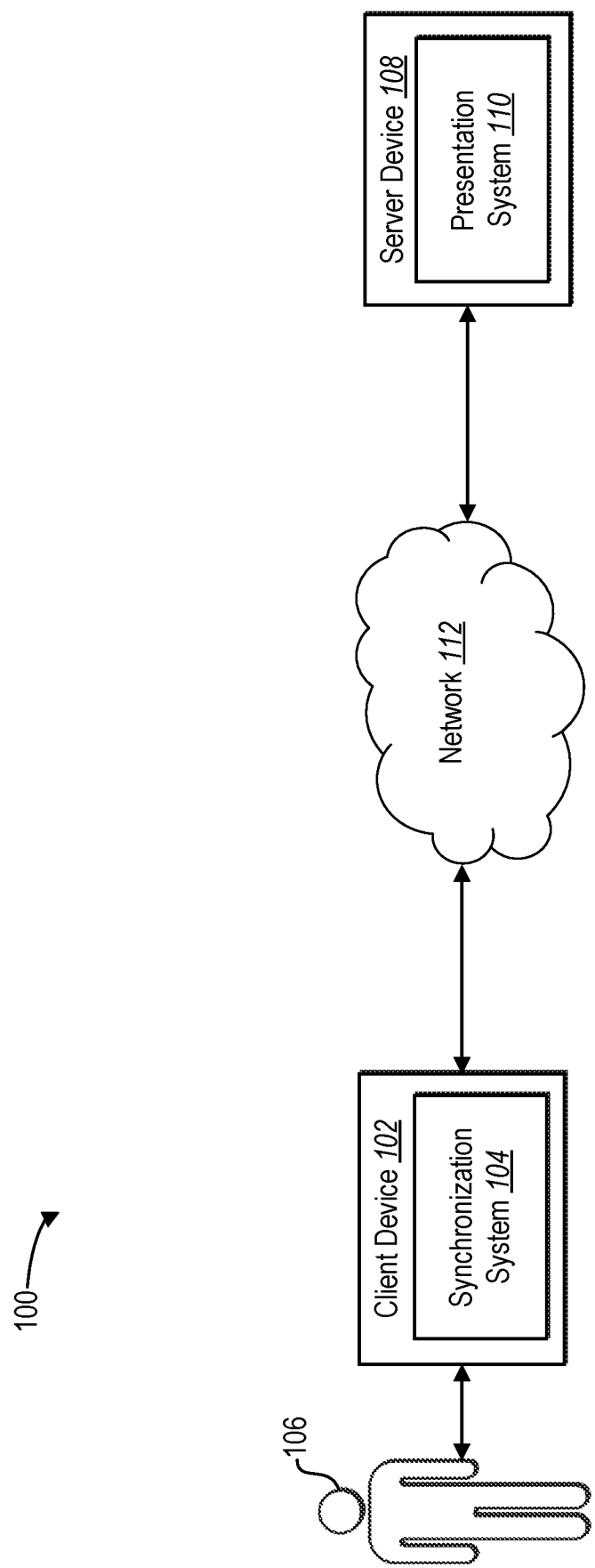
FIG. 1 illustrates a block diagram of a view management system in accordance with one or more embodiments.

One or more embodiments disclosed herein provide a view management system (or simply "system") that presents and synchronizes multiple views of electronic content. In one or more embodiments, the system can provide, to a client device, an electronic document that is associated with document views. Along with providing the electronic document, the system can also provide access to a document model that corresponds to the electronic document. In one or more example embodiments, the system can cause the client device to display multiple document views that are associated with the electronic document (e.g., on a display screen or monitor of the client device). While displaying the multiple document views, the system can synchronize the multiple document views by binding each of the multiple document views with the document model that corresponds with the electronic document. In particular, upon detecting a user interaction that changes one of the multiple document views, the system can use the document model to cause the client device to determine and apply corresponding changes to the other document views of the multiple document views. Therefore, and as will be explained in more detail below, the system can enable a user to conveniently observe how one or more user interactions with respect to a particular document view would function across multiple different document views.

In one or more embodiments, the system can cause one or more client devices to simultaneously present multiple document views of an electronic document for display to a user. For example, the system can provide a first document view corresponding to a desktop view showing how the electronic document would appear on a desktop computer. Additionally, the system can provide a second document view corresponding to a mobile view showing how the electronic document would appear on a mobile device. Additionally, while the system can facilitate presenting the different document views on a client device within a single graphical user interface, one or more embodiments of the system can cause multiple client devices to simultaneously provide respective views of the electronic document (e.g., each of the multiple client devices provides a document view corresponding to the display capabilities of each client device).

Additionally, in one or more embodiments, the system can use a document model to allow a user to view the results of one or more user interactions with an electronic document with respect to multiple document views associated with the electronic document. In particular, the system can cause a client device to establish a two-way binding between each of the multiple document views and the document model. The two-way binding allows the system to synchronize changes to an electronic document, resulting from one or more user interactions with respect to one of the document views, to be applied to the other document views that are bound to the document model. For example, a user can provide a user interaction with respect to a first document view that includes user input (e.g., answering a survey question). In response to receiving the user input, the system can update the document model with the user input, and then based on the updated document model, the system can update one or more additional document views to reflect the user input that the user provided with respect to the first document view.

Additionally, in one or more embodiments, the system can translate a user's manipulation of a graphical user interface corresponding to a particular document view to one or more additional document views. In some embodiments, the system can translate the manipulation without updating a document model. For instance, in one or more embodiments, the system can receive one or more user interactions that manipulate a graphical user interface within a first document view (e.g., a user scrolling an electronic document in the first document view). In response, the system can translate the manipulation of the graphical user interface within the first document view to one or more graphical user interfaces that correspond to additional document views. As such, a user of the client device can interact with a first document view and simultaneously see how the interactions with respect to the first view would affect the one or more additional document views.

By binding multiple document views to a document model and/or otherwise synchronizing multiple document views, one or more embodiments of the system allow a user to avoid generating and testing separate versions of an electronic document on various different electronic devices. In particular, and unlike conventional systems, the system can facilitate simultaneous presentation and synchronization of different document views of the same electronic document. For example, as described above, the system can provide a first document view (e.g., a desktop view) and a second document view (e.g., a mobile view) that presents different document views corresponding to the way the electronic document would appear on the two different client devices having different display capabilities. As such, the system allows a user to edit, modify, or otherwise preview the electronic document in multiple views that simulate the display capabilities of a variety of client devices, and as such, the system efficiently allows a user to create and provide an electronic document that is well-suited for display and interaction on a variety of different client devices.

In addition to presenting multiple document views and synchronizing one or more user interactions across the multiple document views, one or more embodiments of the system can also facilitate convenient rendering of a document view on a specific client device that is separate from a client device used to create an electronic document (e.g., when a user wants to see how an electronic document appears on a specific client device). In particular, the system can establish a document session associated with an electronic document a user is viewing on a first client device (e.g., a desktop). The system can further provide, via the first client device, a visual identifier that is associated with the document session (e.g., a QR code). A second client device (e.g., a mobile device) can scan or otherwise detect the visual identifier, and based on the association between the document session and the visual identifier, the second client device can use the visual identifier to access and present the electronic document to the user on the second client device. Thus, the system allows a user to quickly and conveniently see how a specific client device (e.g., the mobile device) presents a display of the electronic document the user is currently viewing on the first client device (e.g., the desktop).

Moreover, and as will be described in greater detail below, one or more embodiments of the system relate to synchronizing and presenting views of an electronic survey provided via various types of client devices. For instance, a server may provide to a client device an electronic survey including a survey model and associated views in a manner that allows the client device to present multiple views of the electronic survey within a graphical user interface. Additionally, the client device can bind the survey model and associated views to establish a two-way binding between the views and the associated survey model. As such, the client device can synchronize each of the views of the electronic survey and cause any user interactions that a user provides (e.g., selecting a question, scrolling through the survey) with respect to one view of the electronic survey to be applied to the additional views associated with the electronic survey. Thus, while features and characteristics of the systems and methods described herein can relate generally to any type of electronic document, some embodiments will be described in terms of an electronic survey (e.g., an online survey).

As used herein, the term "electronic document" refers to a defined portion of digital data (e.g., a data file). Examples of electronic documents include, but are not limited to, digital documents of all types, digital images, digital video files, digital audio files, streamed content, contact lists, and/or folders that include a defined portion of digital data. In one or more embodiments, an electronic document may refer to an electronic survey administered to a user using one or more client devices. For example, an electronic document may refer to an electronic survey provided via a website and presented on a client device. Further, the term "electronic content" or "electronic document" may refer interchangeably to an entire electronic document file or a portion thereof. For example, a section or portion of an electronic document can include electronic content or the entire electronic document. Additionally, electronic documents can include representations, such as previews or reduced-resolution versions of electronic documents (e.g., document previews, thumbnail images, low-quality files, compressed files).

Additionally, as will be described in greater detail below, an electronic document can correspond to a document model. As used herein, the term "document model" refers to data associated with the electronic document. In particular, the document model can include any display logic or status associated with one or more states of an electronic document. For example, the document model can include a state of a document session, a state of one or more data fields included within an electronic document, or a state of one or more selectable features within an electronic document. In one or more embodiments, the document model includes definitions and display logic for interactive features within an electronic document. As an example, where an electronic document includes an electronic survey having a plurality selectable answer options, the document model can include states of the answer options (e.g., selected, not selected) or specific values of user responses (e.g., 7 on a scale of 1-10).

Further, the electronic document can have any number of associated views. As used herein, the term "document view" or simply "view" refers to a particular presentation of an electronic document within a display area on a client device. In particular, a view may refer to a format, layout, or other presentation data that defines or controls the presentation of an electronic document within a graphical user interface or within a display area particular to a client device. In one or more embodiments, a document view corresponds to a format, layout, or appearance of an electronic document within a graphical user interface on a particular type or model of client device. Examples of different views include, but are not limited to, desktop views, tablet views, or mobile views referring to a layout or other presentation feature of the electronic document within a display of a desktop computer, tablet, or mobile device, respectively. Additionally, a view may correspond to a display device having a particular display area dimensions (e.g., physical dimensions, pixel dimensions) or a particular aspect ratio independent of the dimensions of a particular display device (e.g., the aspect ratio of a window of a graphical user interface). In one or more embodiments, the view may refer to a particular cascading style sheet (CSS) class defined or otherwise identified by the document model or included within a file of the electronic document.

Additionally, as used herein, the term "user interaction" or "interaction" refers to a user input (e.g., a user command or request). In particular, a user interaction may refer to a single interaction, or combination of interactions, received from a user by way of one or more input devices. In one or more embodiments, a user interaction can refer to an interaction with a view of an electronic document that modifies, changes, or otherwise manipulates a value or state within a document model. Alternatively, a user interaction can refer to an interaction with a graphical user interface within which a presentation of the electronic document is provided to a user that does not modify, change, or otherwise manipulate any values or states within the document model. As an example, a user interaction that manipulates a graphical user interface can refer to a scrolling interaction in which a view of the graphical user interface is modified without necessarily applying any changes or manipulations to the document model corresponding to the electronic document.

Additional features and characteristics of one or more embodiments of the system are described below with respect to the Figures. For example, FIG. 1 illustrates a block diagram of an example embodiment of a view management system 100 (or simply "system 100"). In general, and as illustrated in FIG. 1, the system 100 includes a client device 102 including a synchronization system 104. Additionally, the client device 102 may be associated with a user 106. The client device 102 can communicate with a server device 108 including a presentation system 110. In particular, the client device 102 can communicate with the server device 108 over a network 112. As will be described in greater detail below, the client device 102 can perform or provide the various functions, features, processes, methods and systems as described herein. Additionally or alternatively, the server device 108 can perform or provide the various functions, features, processes, methods and systems as described herein. In one or more embodiments, the client device 102 and server device 108 coordinate together to perform or provide the various functions, features, processes, methods and systems, as described in more detail below.

Generally, the client device 102 can include any one of various types of client devices. For example, the client device 102 can be a mobile device (e.g., a smart phone), tablet, laptop computer, desktop computer, or any other type of computing device as further explained below with reference to FIG. 10. Additionally, the server device 108 can include one or more computing devices including those explained below with reference to FIG. 10. The client device 102, server device 108, and network 112 may communicate using any communication platforms and technologies suitable for transporting data and/or communication signals, including any known communication technologies, devices, media, and protocols supportive of data communications, examples of which are described with reference to FIG. 11.

As an initial overview of one or more embodiments of the system 100, the server device 108 may provide an electronic document to the client device 102 by way of the network 112. In one or more embodiments, the server device 108 provides the electronic document via a webpage. As an example, the server device 108 can provide an electronic survey to the client device 102 for administration to the user 106 via a webpage. Additionally, one or more embodiments of the server device 108 can provide a document model (or simply "model") and associated document views (or simply "views") corresponding to the electronic document to the client device 102 over the network 112.

Upon receiving the electronic document, the client device 102 can present a plurality of views of the electronic document. In particular, the client device 102 can bind any number of views with a model associated with the electronic document. More specifically, the client device 102 can bind the model and views by establish a two-way binding between the views and the model such that any changes to the model will be applied to the different views. Conversely, the binding between the views and the model may cause any changes to one or more views to be applied to the model.

For example, as will be explained in greater detail below, the client device 102 may enable the user 106 to interact with the electronic document by providing multiple views of the electronic document within a graphical user interface on the client device 102. For example, the user 106 can interact with the electronic document on the client device 102 by modifying text, selecting one or more selectable options, or otherwise modifying data within the electronic document. One or more interactions with a particular view may change a model state or modify one or more values within the model corresponding to the electronic document. As such, the client device 102 may facilitate updating the model, as well as updating any views that are bound to the model, in accordance with the user interaction. Additionally, in cases where a user interaction alters a particular document view or graphical user interface without changing one or more values within the document model, the client device 102 can translate the user interaction or interface manipulation and apply the translated interaction or manipulation to other document views to reflect the user interaction.

In order to present the synchronized document views, in one or more embodiments, the system 100 can cause client device 102 to provide multiple views of the electronic document within a graphical user interface on a single client device. For example, the client device 102 can simultaneously provide multiple views of the electronic document on different portions of a graphical user interface. Additionally, the client device 102 can provide the updated views of the electronic document as the user 106 interacts with one or more of the respective views. For example, in the case where the electronic document is an electronic survey, the client device 102 can provide a desktop view of the survey and a mobile view of the survey within a graphical user interface. In response to the user 106 selecting an answer option on the desktop view, the client device 102 can synchronize both the desktop view and the mobile view and provide a display of both the desktop view and the mobile view within the graphical user interface indicating how the user selection would appear in each of the views. Additional details regarding updating and synchronizing multiple views of an electronic document will be discussed further below.

Figure 2:
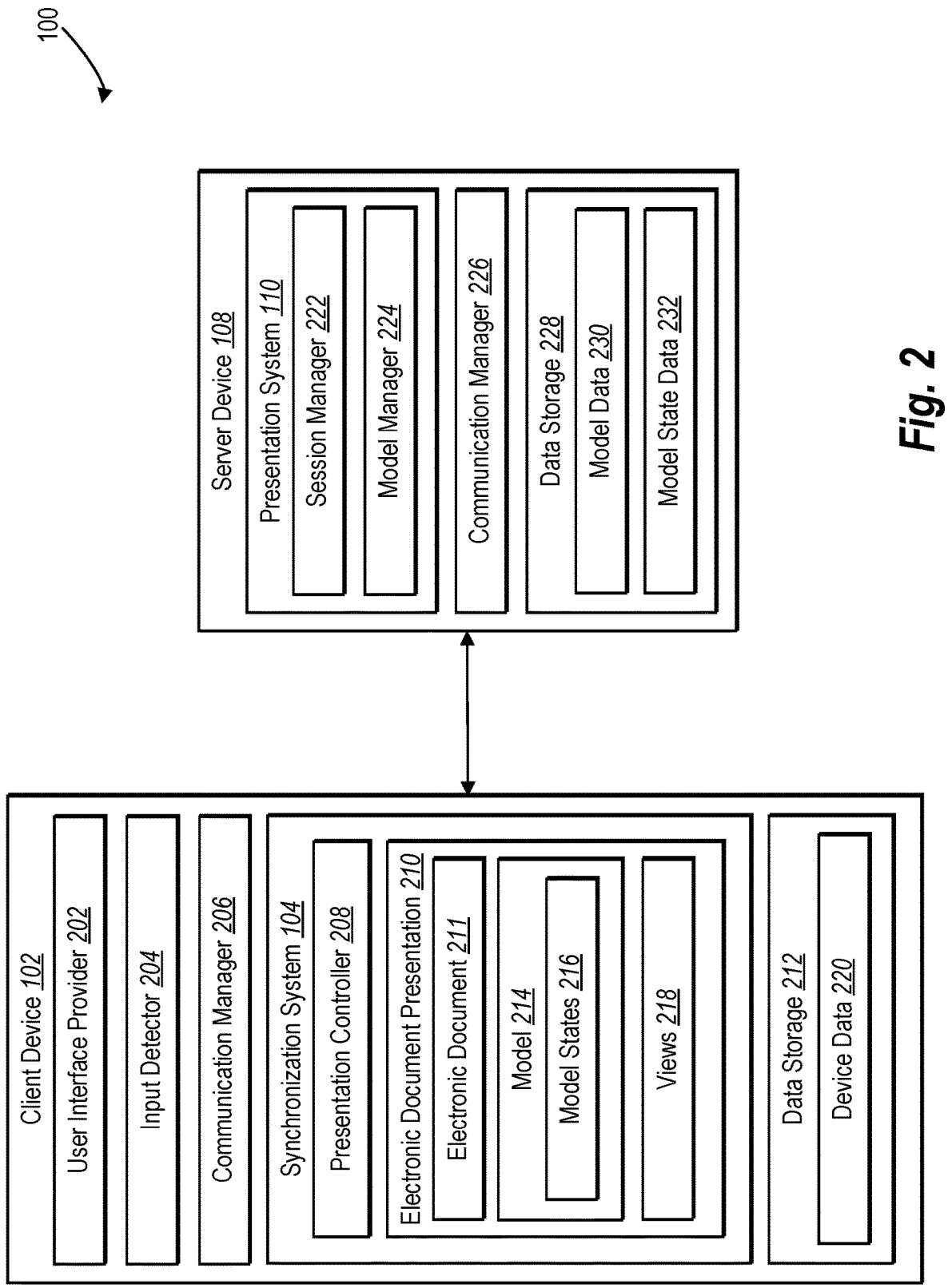
FIG. 2 illustrates a schematic diagram of a synchronization system and a presentation system upon which at least a portion of a view management system is implemented in accordance with one or more embodiments.

FIG. 2 illustrates an example embodiment of a client device 102 including a synchronization system 104 and a server device 108 including a presentation system 110 for presenting and synchronizing views of electronic content (e.g., an electronic document). As shown, the client device 102 can include, but is not limited to, a user interface provider 202, an input detector 204, and a communication manager 206. Further, and as illustrated in FIG. 2, the client device 102 includes a synchronization system 104 having a presentation controller 208 and an electronic document presentation 210. In addition, the electronic document presentation 210 can include a model 214, which includes one or more model states 216, and a plurality of associated views 218. In one or more embodiments, the electronic document presentation 210 further includes an electronic document 211 presented to the user 106 within one or more associated views 218. Additionally, as shown in FIG. 2, the client device 102 further includes a data storage 212 including device data 220.

Each of the components 202-220 of the client device 102 may be in communication with one another using any suitable communication technologies. In addition, although components 202-220 may be combined into fewer components, such as into a single component, or divided into more components as may serve a particular embodiment. In addition, components 202-220 may be located on, or implemented by, one or more computing devices, such as one or more client devices and/or one or more server devices (e.g., server device 108).

As further shown in FIG. 2, the server device 108 can include a presentation system 110 that includes a session manager 222 and a model manager 224. The server device 108 can further include a communication manager 226. Furthermore, the server device 108 can include a data storage 228, including model data 230 and model state data 232, as shown in FIG. 2. It will be recognized that although components 222-232 are shown separately in FIG. 2, any of components 222-232 may be combined into fewer components, such as into a single component, or divided into more components as may serve a particular embodiment. Components 222-232 may be located on, or implemented by, one or more computing devices, such as one or more server devices.

Each of components 202-232 can comprise software, hardware, or both. For example, each of components 202-232 can comprise one or more instructions stored on a computer-readable storage medium and one or more processors of one or more computing devices to execute instructions. When executed by the one or more processors, the computer-executable instructions cause a computing device to perform the methods described herein. Alternatively, components 202-232 can comprise hardware, such as a special purpose processing device to perform a certain function or group of functions.

As mentioned above, the server device 108 can provide access to an electronic document presentation 210 including an electronic document 211 and associated document data (e.g., model 214, views 218) to the client device 102. As used herein, an "electronic document presentation 210" can refer to a presentation that includes an electronic document 211. In addition, the electronic document presentation 210 can include a model 214 associated with the electronic document 211 and one or more document views 218. In one or more embodiments, the client device 102 receives from the server device 108 the electronic document 211 of the electronic document presentation 210, while the client device 102 remotely accesses the model 214 and associated views 218, which are maintained on the server device 108. Alternatively, or additionally, in one or more embodiments, the client device 102 receives from the server 108 the electronic document presentation 210 that includes the electronic document 211, the model 214, and any number of associated views 218.

In one or more embodiments, the server device 108 provides the electronic document 211 and associated document data via the Internet in the form of a webpage and/or website. For example, in one or more embodiments, the server device 108 provides an electronic document presentation 210 including an electronic document 211, a model 214, and multiple views 218 associated with the model 214 for viewing the electronic document 211. As will be described in greater detail below, the client device 102 can provide a request to the server device 108 to access an electronic document 211. In response, the server device 108 can provide the document model 214 and any number of associated document views 218 to the client device 102.

As shown in FIG. 2, the client device 102 can include a user interface provider 202. The user interface provider 202 can provide a graphical user interface (or simply "user interface") that allows a user 106 to view, navigate, browse, interact with, or otherwise experience electronic content using the client device 102. For example, the user interface provider 202 can provide a user interface that includes a presentation of an electronic document 211 on the client device 102 (e.g., on a display device). Likewise, the user interface provider 202 can provide a user interface that facilitates interaction with one or more views 218 of the electronic document 211. As an example, the user interface provider 202 can provide multiple views of an electronic survey to a user 106 to illustrate how an electronic survey would appear on different types of client devices or within different display areas (e.g., display areas having different dimensions).

Additionally, as mentioned above, the user interface provider 202 can provide multiple views 218 of an electronic document 211 within a graphical user interface (e.g., by way of a display screen associated with the client device 102). In particular, the user interface provider 202 can simultaneously provide multiple views 218 of an electronic document 211, where each of the multiple views 218 provide a presentation of the electronic document 211 as the electronic document 211 would appear within different display areas and/or on different types of client devices. As an example, the user interface provider 202 can provide a desktop view within a first portion of a graphical user interface. In addition, the user interface provider 202 can provide a mobile view within a second portion of the graphical user interface. The user interface provider 202 can provide any number of views 218 of an electronic document 211 within the graphical user interface on the client device 102. For example, the user interface provider 202 can provide different mobile views corresponding to different types and models of mobile devices, or one or more views corresponding to different types of client devices (e.g., desktop computers, tablets, mobile phones).

As further illustrated in FIG. 2, the client device 102 can include an input detector 204. In one or more embodiments, the input detector 204 can detect, identify, and/or receive a user interaction and translate the user interaction into a user input (e.g., a user command or request). As mentioned above, a user interaction can refer to a single interaction, or combination of interactions, received from the user 106 by way of one or more input devices. In some embodiments, the input detector 204 can translate a combination of user interactions as a single input and/or translate a single user interaction into multiple inputs.

For example, the input detector 204 can detect a user interaction from a keyboard, mouse, touch screen, or any other input device as part of a communication with the client device 102. In the event a touch screen is used as an input device, the input detector 204 can detect one or more touch gestures (e.g., swipe gestures, tap gestures, pinch gestures, or reverse pinch gestures) that user 106 provides via the touch screen. In one or more embodiments, the user 106 provides one or more touch gestures in relation to and/or directed at one or more graphical elements associated with answers corresponding to a survey question of an electronic survey via a user interface presented on a touch screen. Additionally, or alternatively, the input detector 204 can receive data representative of a user interaction. For example, the input detector 204 can receive one or more user configurable parameters from the user 106, one or more commands from the user 106, and/or any other suitable user input.

The user interface provider 202 can utilize user input and/or other data received from the input detector 204 to manage, control, and/or facilitate the use of a user interface. In general, in response to the input detector 204 detecting one or more user interactions, the user interface provider 202 can provide a user interface that allows the user 106 to view, navigate, browse, interact with, or otherwise experience electronic content using the client device 102. For instance, and as explained herein, the user interface provider 202 can provide a user-friendly and intuitive user interface that simultaneously presents different views of an electronic document 211. Additionally, as will be explained in greater detail below, the input detector 204 can allow the user 106 to modify a display area as well as interact with views of electronic content presented by the client device 102.

As mentioned above, and as illustrated in FIG. 2, the client device 102 can further include a communication manager 206. The communication manager 206 can facilitate receiving and sending data to and from the client device 102. In particular, the communication manager 206 can facilitate sending and receiving electronic communications. In one or more embodiments, the communication manager 206 facilitates receiving an electronic document presentation 210 from the server device 108, including the electronic document 211, document model(s) 214, document views 218, and other data associated with presenting one or more views of the electronic document 211 to a user 106. Additionally, in one or more embodiments, the communication manager 206 communications information associated with user interactions with the electronic document 211. For example, where the electronic document 211 is an electronic survey, the communication manager 206 provides information associated with any responses or interactions by the user with the electronic survey to the server device 108.

As described above, the user interface provider 202 and input detector 204 coordinate to present multiple views 218 of an electronic document 211 within a graphical user interface and further facilitate detecting or otherwise receiving one or more user interactions with respect to one or more views 218 of the electronic document 211. Additionally, as illustrated in FIG. 2, the client device 102 includes a synchronization system 104 that synchronizes multiple views 218 of an electronic document 211 based on one or more detected user interactions. In particular, in one or more embodiments, the synchronization system 104 can include a Javascript Form Engine that performs the methods, processes, and functions of the synchronization system 104. As an example, where the input detector 204 receives a user interaction with respect to a document view, the synchronization system 104 can apply the user interaction to each of multiple document views 218. Thus, the synchronization system 104 can provide a preview or presentation of the electronic document 211 that illustrates how one or more user interactions will appear across any number of document views 218.

In accomplishing one or more synchronization features, the synchronization system 104 can utilize a presentation controller 208 and an electronic document presentation 210. In particular, and as mentioned above, the client device 102 can receive the electronic document presentation 210 from the server device 108. The presentation controller 208 can access the model 214 from the electronic document presentation 210 and bind the model 214 to each of multiple views 218.

In one or more embodiments, the presentation controller 208 binds each of the views 218 associated with the model 214 such that, in response to identifying one or more changes to a view 218, the presentation controller 208 updates the model 214 based on the one or more changes (e.g., a user selecting an answer). For example, in one or more embodiments, the presentation controller 208 binds each of the views 218 to the model 214 by associating a reference between the document model 214 and each of the plurality of views 218. In addition, upon updating the model 214, the presentation controller 208 can use the updated model 214 to apply the one or more changes to each of the views 218 that are bound to the model 214. In one or more embodiments, the presentation controller 208 binds all of the views 218 associated with the electronic document presentation 210 with the model 214. Alternatively, the presentation control 208 can bind a portion of the views 218 to the model 214 without binding all of the views 218.

Additionally, as mentioned above, the synchronization system 104 can cause one or more user interactions with respect to the different views 218 to be applied across any number of the views 218 associated with the electronic document 211. Further, as will be described in greater detail below, the synchronization system 104 may cause different types of user interactions to be synchronized differently across the different views. For instance, one or more user interactions with respect to the views 218 may involve changing one or more model states 216 of the document model 214. Alternatively, one or more user interactions with respect to the views 218 may involve manipulating a graphical user interface without affecting the model 214 and/or one or more model states 216.

With respect to changing or updating one or more model states 216, the synchronization system 104 may receive an indication of a user interaction with a view 218 of an electronic document 211 from the input detector 204. In particular, based on the type of the user interaction, the user interaction may alter a model state 216 or other value of the model 214. As an example, where the electronic document presentation 210 includes an electronic survey presentation, a user 106 may interact with a view 218 of the electronic survey by selecting an answer option within the electronic survey. The selection of an answer response can alter a model state 216 that corresponds to a selection status (e.g., a state) of the answer option. For instance, upon identifying the selection of the answer option, the synchronization system 104 can change or update a model state 216 between "not-selected" and "selected."

In response to updating the model 214 to reflect the change in the model state 216, the synchronization system 104 can cause each of the views 218 that are bound to the model 214 to also reflect the change to the model state 216. For example, where the user interface provider 202 provides multiple views 218 within a graphical user interface, the synchronization system 104 can determine that a user interaction that a user directs at a first view of the views 218 is a type of user interaction that affects the model 214. In response to determining that the user interaction with respect to the first view modifies the model 214, the synchronization system 104 can apply the modification to the model 214 (e.g., update a model state 216). Based on the updated model 214, the synchronization system 104 can then apply any changes to the views 218 that are bound to the model 214. For example, the synchronization system 104 can cause the user interface provider 202 to present each of the multiple views 218 in accordance with the updated model 214 that reflects the user interaction with the first view.

In another example, the synchronization system 104 can determine that a user interaction with respect to a view 218 of the electronic document presentation 210 does not modify one or more values of the model 214. For example, the synchronization system 104 can determine that a particular user interaction with respect to a first view manipulates or otherwise modifies a portion of the graphical user interface presenting the first view without affecting the model 214. For instance, a user may perform a scrolling interaction in a process of navigating an electronic document 211 within the first view, where the scrolling interaction does not modify one or more values of the model 214. In response, the synchronization system 104 can synchronize the scrolling interaction with respect to a first view to any other views 218 associated with the electronic document presentation 210 (e.g., cause the other views to scroll a proportional amount based on the characteristics of each of the other views).

For example, where the user interface provider 202 provides a first view (e.g., a desktop view) of the electronic document 211 and a second view (e.g., a mobile view) of the electronic document 211 within different portions of a graphical user interface, the synchronization system 104 can determine that one or more user interactions manipulate a graphical user interface and apply the user interactions and/or graphical user interface manipulation to both the first view and the second view. Specifically, where a user 106 scrolls through the first view, the presentation controller 208 can identify the scrolling interaction and translate the scrolling interaction for the second view. The presentation controller 208 can further apply the translated scrolling interaction (or other interface manipulation) to the second view, thereby presenting, to a user via the graphical user interface, how the user interaction would affect both the first view and the second view. In one or more embodiments, presentation controller 208 applies the user interaction to only those views 218 that are presented via the graphical user interface. Alternatively, the presentation controller 208 can apply the user interaction to any number of the views 218 associated with the electronic document presentation 210.

As mentioned above, and as shown in FIG. 2, the client device 102 can further include a data storage 212 that includes device data 220. In particular, the device data 220 can include any information associated with the client device 220. For example, the device data 220 can include an identifier of the client device 102 for use in tracking one or more user interactions with respect to an electronic document presentation 210 provided by the server device 108. For instance, as will be described in greater detail below, the client device 102 and/or server device 108 may associate an electronic document presentation 210 with a particular document session and track one or more user interactions based on an identifier of the client device 102 and/or information associated with a display of the client device 102. In addition, in one or more embodiments, the device data 220 includes data associated with a type or model of the client device 102 and may be used in determining a particular view 218 to use in providing a display of the electronic document 211.

Additionally, as mentioned above, the view management system 100 can further include a server device 108. As illustrated in FIG. 2, the service device 108 can include a presentation system 110 that facilitates providing the client device 102 access to the electronic document presentation 210. For example, the presentation system 110 can provide access to an electronic document 211 and associated data (e.g., models 214, views 218) to the client device 102. For example, presentation system 110 can generate, receive, or otherwise access an electronic document presentation 210 and cause the communications manager 226 to transmit, share, or otherwise provide the client device 102 access to the electronic document presentation 210.

In one or more embodiments, the presentation manager 110 facilitates establishing and maintaining a document session for the electronic document presentation 210 in which the presentation system 110 can perform one or more synchronization functions between one or more views 218 presented on the client device 102 and a corresponding model 214. For example, as shown in FIG. 2, the presentation system 110 includes a session manager 222. In particular, the session manager 222 can establish a document session whereby the presentation system 110 provides access to an electronic document presentation 210 and maintains a record of data submitted to the server device 108 throughout the duration of the document session. As used herein, a "document session" or "session" can refer to a record of any data that the server device 108 receives from the client device 102 with respect to an electronic document 211 or electronic document presentation 210. For example, a document session can include a record or history of interactions associated with a particular electronic document 211 that the server device 108 provides to the client device 102. Additionally, the document session can include a record of any user interactions directed to one or more views of an electronic document 211 that affect the document model 214, including one or more model states 216, or other changes or modifications to the model 214.

In establishing a document session, the session manager 222 can assign a session identifier (or simply "session ID") that identifies a particular document session. In one or more embodiments, the session manager 222 can assign a session ID in response to the client device 102 requesting access to the electronic document presentation 210. For example, the first time that the session manager 222 receives a request to access an electronic document presentation 210, the session manager 222 assigns a unique session ID that the presentation system 110 can use to identify a history of user interactions with respect to the electronic document 211. For example, the session manager 222 can assign the session ID to a document model 214 and associated views 218 for the electronic document presentation 210, and continue to associate the session ID to the document model 214 and associated views 218 as one or more user interactions update the model 214 and views 218.

In addition, as shown in FIG. 2, the presentation system 110 includes a model manager 224 that manages one or more document models 214 associated with a particular document session. For example, the model manager 224 can maintain a master document model for a document session that corresponds to a document model 214 that the server device 108 provided to various client devices. In one or more embodiments, the model manager 224 can receive one or more user interactions and/or updated models 214 based on user interactions performed on the client device 102, and in response to receiving the updated models 214, the model manager 224 can apply any updates to the master model maintained for a particular document session. As such, the model manager 224 can synchronize multiple document models across different client devices that are linked to a particular document session.

Figure 7:
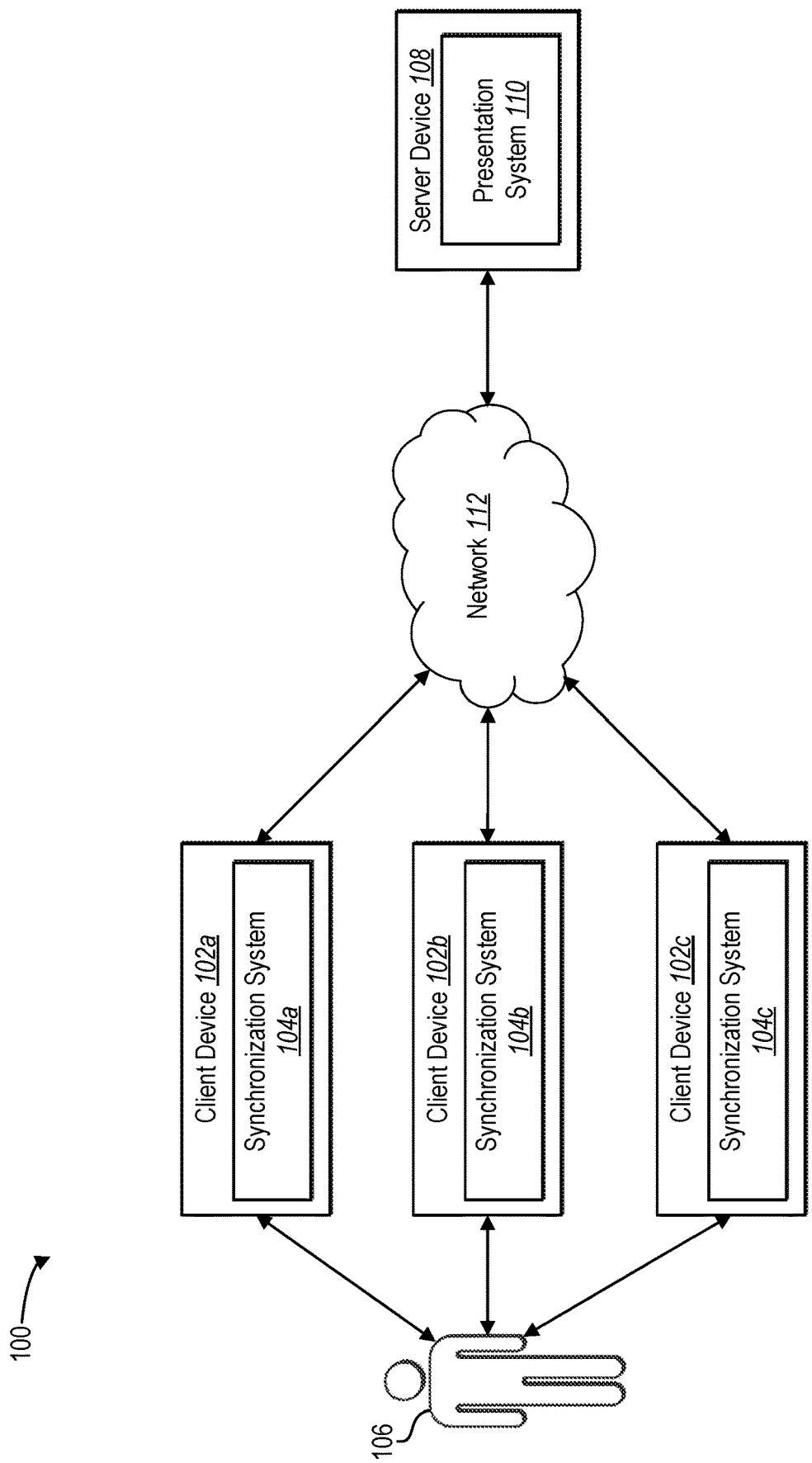
FIG. 7 illustrates a block diagram of a view management system in accordance with one or more embodiments.

For example, as will be expounded upon in FIG. 7, a server device 108 may communicate with multiple client devices 102 that present different views 218 of an electronic document 211 associated with a particular document session. Where a user interacts with a view on one of the client devices, the client device can communicate with the server device 108 to update a document model 214 maintained on the server device 108. In response, the server device 108 may update a master model for the document session, and share, transmit, or otherwise provide the updated master model to the other client devices that are associated with the document session. In this way, the presentation system 110 can cause multiple devices to present synchronized views 218 of the electronic document 211 to reflect any number of user interactions with a particular view 218 on a client device 102.

Additionally, as shown in FIG. 2, and as mentioned above, the server device 108 can include a communication manager 226 that facilitates receiving and sending data to and from the server device 108. The communication manager 226 on the server device 108 can include similar features and functionality as the communication manager 206 on the client device 102. Additionally in one or more embodiments, the communication manager 226 provides the electronic document presentation 210 to the client device 102 and receives data associated with the electronic document presentation 210 from the client device 102. For example, where the electronic document presentation 210 includes an electronic survey presentation, the communication manager 226 can receive selections of answers to the electronic survey. Additionally, the communication manager 226 can receive updates to the model 214 and communicate any changes to a document model 214 to one or more additional client devices.

Further, as shown in FIG. 2, the server device 108 can include a data storage 228 including similar features and functionality as the data storage 212 on the client device 102. Additionally, as shown in FIG. 2, the data storage 228 can include model data 230 including information associated with the model 214 on the client device 102 and/or information for a master model that is associated with a document session and/or an electronic document presentation 210 provided to multiple devices. In one or more embodiments, the model data 230 includes model information associated with a particular document session including, for example, information associated with models that have been provided to multiple client devices having access to electronic document presentations that are associated with the same document session.

Further, as shown in FIG. 2, the data storage 228 includes model state data 232. The model state data 232 can include state information for a model 214 associated with an electronic document presentation 210. For example, the model state data 232 can include information related to any display logic or selectable features included within an electronic document presentation 210. In the case that the electronic document presentation 210 is a presentation of an electronic survey, the model state data 232 can include selected answers or selected values included within the electronic survey.

Figure 3:
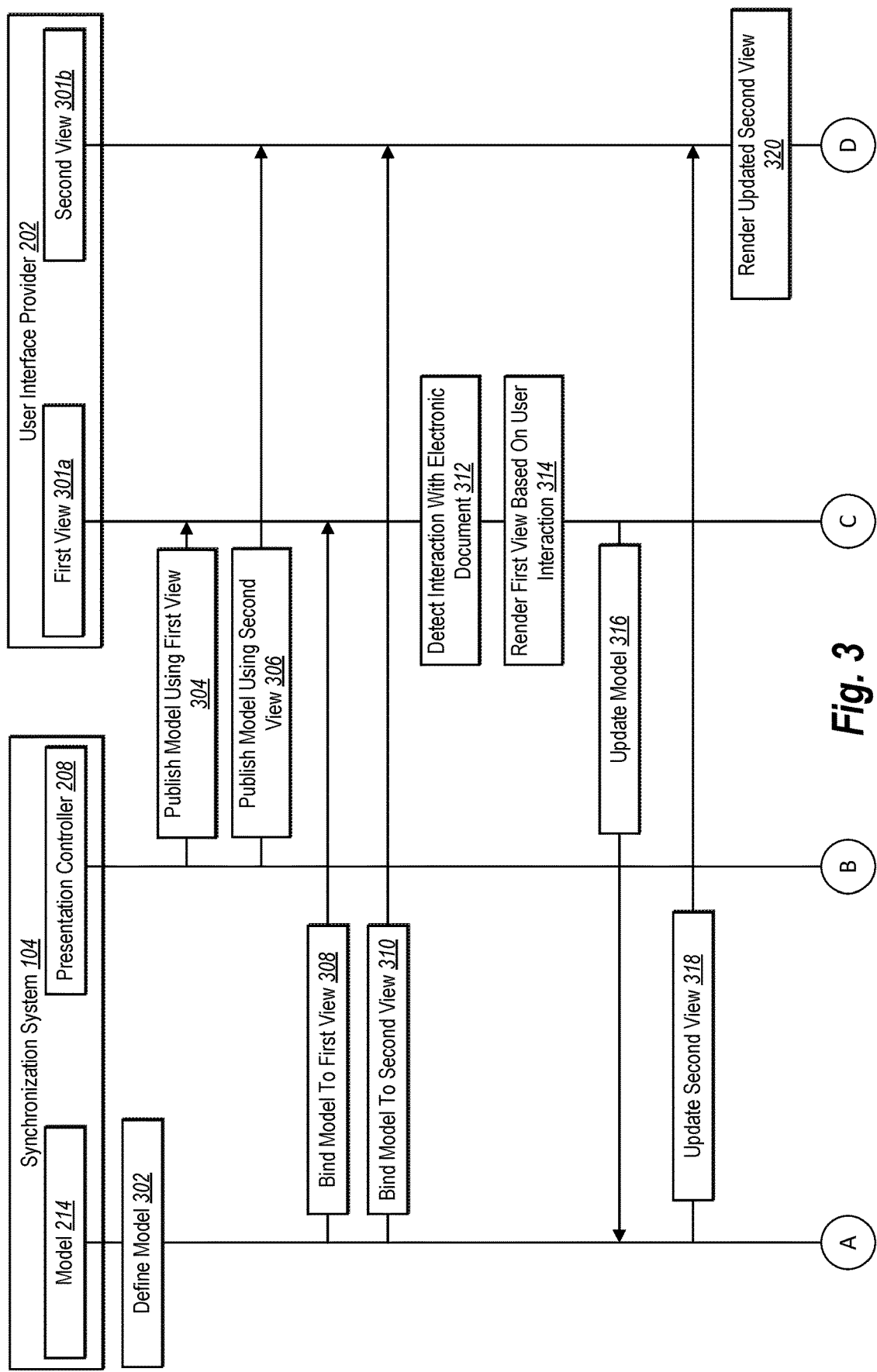
FIG. 3 illustrates a flow diagram of interactions between a synchronization system and a user interface provider in accordance with one or more embodiments.

FIG. 3 illustrates a flow diagram representing a process of synchronizing multiple views of an electronic document 211. As shown in FIG. 3, the flow diagram includes a synchronization system 104 and a user interface provider 202. The synchronization system 104 and the user interface provider 202 can include similar features and functionality as the synchronization system 104 and the user interface provider 202 described above in connection with FIG. 2. In particular, FIG. 3 illustrates a process of a presentation controller 208 synchronizing a model 214, a first view 301a, and second view 301b, presented by the user interface provider 202. More specifically, FIG. 3 illustrates one example embodiment for synchronizing multiple views 301a-b of an electronic document 211 provided to a user 106 on a client device 102.

As illustrated in FIG. 3, the synchronization system 104 can include a model 214 and a presentation controller 208. Additionally, the user interface provider 202 can provide a first view 301a and a second view 301b associated with the model 214. As shown in FIG. 3, the synchronization system 104 can define 302 the model 214 for a corresponding electronic document presentation 210. Defining the model 214 may include generating and/or associating the model 214 with an electronic document 211 locally on the client device 102. Alternatively, defining the model 214 may include receiving the model 214 from a server device 108. As described above, the model 214 can include any display logic, status, definitions, or other information associated with the electronic document 211.

Additionally, as shown in FIG. 3, the presentation controller 208 can publish 304 the model 214 using the first view 301a. In particular, the presentation controller 208 can provide a presentation of an electronic document 211 as it would appear within a first view 301a on a graphical user interface of the client device 102. As an example, where the first view 301a is a desktop view, the presentation controller 208 can publish the model 214 using the desktop view to illustrate within the graphical user interface on the client device 102 how the electronic document 211 would appear on a desktop computer (or within a view area having similar dimensions as a desktop computer). In one or more embodiments, the presentation controller 208 provides the first view 301a of the electronic document 211 within a first portion of a graphical user interface.

Further, as shown in FIG. 3, the presentation controller 208 can publish 306 the model 214 using the second view 301b. In particular, the presentation controller 208 can provide a presentation of the electronic document 211 as it would appear within a second view 301b on the graphical user interface of the client device 102. As an example, where the second view 301b is a mobile view, the presentation controller 208 can publish the model 214 using the mobile view to illustrate within the graphical user interface on the client device 102 how the electronic document would appear on a mobile device (or within a view area having similar dimensions as a mobile device). In one or more embodiments, the presentation controller 208 provides the second view 301b of the electronic document 211 within a second portion of the graphical user interface.

Additionally, in one or more embodiments, the presentation controller 208 provides the first view 301a and the second view 301b of the electronic document 211 within the same graphical user interface of the client device 102. As an example, the presentation controller 208 can provide the first view 301a (e.g., a desktop view) within a first portion of a graphical user interface on the client device 102. In addition to the first view 301a, the presentation controller 208 can simultaneously provide the second view 301b (e.g., a mobile view) within a second portion of the graphical user interface. The presentation controller 208 can publish any number of views of an electronic document 211 within one or multiple graphical user interfaces.

Further, as shown in FIG. 3, the synchronization system 104 binds 308 the model 214 to the first view 301a. In one or more embodiments, the synchronization system 104 binds the model 214 and the first view 301a by establishing a two-way binding between the model 214 and the first view 301a such that one or more changes to the model 214 will be applied and reflected to the first view 301a. Additionally, the two-way binding between the model 214 and the first view 301a can cause any changes or interactions with the first view 301a to be applied to the model 214. In one or more embodiments, the synchronization system 104 binds the model 214 to the first view 301a by associating a reference between the model 214 and the first view 301a. The reference can serve as a reference between the model 214 and any views 301a-b that are bound to the model 214. Additionally, in one or more embodiments, the reference can reference a document session associated with the electronic document presentation 210, as discussed above.

As further shown in FIG. 3, the synchronization system 104 binds 310 the model 214 to the second view 301b. Binding the model 214 to the second view 301b can include similar steps as described above in connection with binding the model 214 to the first view 301a. As such, the first view 301a can be bound to the second view 301b via the two-way binding between the model 214 and each of the first view 301a and the second view 301b. Further, it is appreciated that the synchronization system 104 can bind any number of views to the model 214 using a reference that facilitates the two-way binding between the model 214 and each of the different views.

Further, as shown in FIG. 3, the first view 301a detects 312 an interaction with an electronic document. For example, an input detector 204 can detect a user interaction (e.g., a touch gesture) with a portion of a graphical user interface on the client device 102 corresponding to the first view 301a of an electronic document 211. In one or more embodiments, the user interaction with the electronic document 211 changes or otherwise modifies a value (e.g., a state) of the model 214. For example, in the case that the electronic document presentation 210 includes an electronic survey, the user interaction with the electronic document 211 within the first view 301a may include a user selection of an answer option that modifies a state for the answer option from "not selected" to "selected," thus modifying a value (e.g., state) of the model 214.

In response to detecting the interaction with the electronic document 211, the first view 301a can render 314 the first view 301a based on the user interaction. In particular, the user interface provider 202 can provide an indication within the first view 301a of the user interaction with the electronic document 211. For example, the user interface provider 202 can provide a visual depiction of the user interaction within the first view 301a. For instance, in the case that the electronic document presentation 210 includes a presentation of an electronic survey, and the user interaction includes a selection of an answer response, the user interface provider 202 can provide a visual indication within the first view 301a of the user selection of the answer response.

While FIG. 3 illustrates one example in which a user interaction is detected and rendered with respect to the first view 301a, one or more embodiments may include detecting and rendering an interaction with respect to the second view 301b. For example, while not expressly indicated in FIG. 3, where the first view 301a is displayed within a first portion of a graphical user interface and the second view 301b is displayed within a second portion of the graphical user interface, the user interface provider 202 can provide an indication within the second view 301b of the user interaction with the electronic document 211 within the second view 301b and synchronize the first view 301a and second view 301b in accordance with the user interaction with respect to the second view 301b.

Additionally, as shown in FIG. 3, the first view 301a can update 316 the model 214. In particular, the first view 301a can provide an indication of any changes to the model 214 to the synchronization system 104. The synchronization system 104 can apply any changes to the model in accordance with the user interaction with the electronic document 211 within the first view 301a. For example, the first view 301a can update the model 214 by providing an indication of one or more state changes within the model 214 corresponding to one or more user interactions with the first view 301a. In one or more embodiments, the synchronization system 104 identifies and applies any interaction with respect to the first view 301a to the model 214 in accordance with the two-way binding established between the model 214 and the first view 301a.

Further, as shown in FIG. 3, the synchronization system 104 can update 318 the second view 301b to reflect the user interaction with the electronic document 211 within the first view 301a. In particular, in accordance with the two-way binding established between the model 214 and the second view 301b, the synchronization system 104 can cause any changes to the model 214 due to interactions with respect to the first view 301a to be applied to the second view 301b. As such, any interactions with the first view 301a can be applied to the model 214 and provided to the second view 301b.

Additionally, as shown in FIG. 3, the second view 301b renders 320 the updated second view 301b. In particular, the user interface provider 202 can provide an updated second view 301b in accordance with the updates to the model 214 consistent with or otherwise based on the user interaction with respect to the first view 301a. As such, the first view 301a and the second view 301b can provide a visual indication to a user 106 how a user interaction with respect to the first view 301a will be applied to the second view 301b. For example, where the first view 301a is a desktop view and the second view 301b is a mobile view, the user interface provider 202 can provide a visualization as to how an interaction with an electronic document 211 in the desktop view will appear within a mobile view.

Figure 4A:
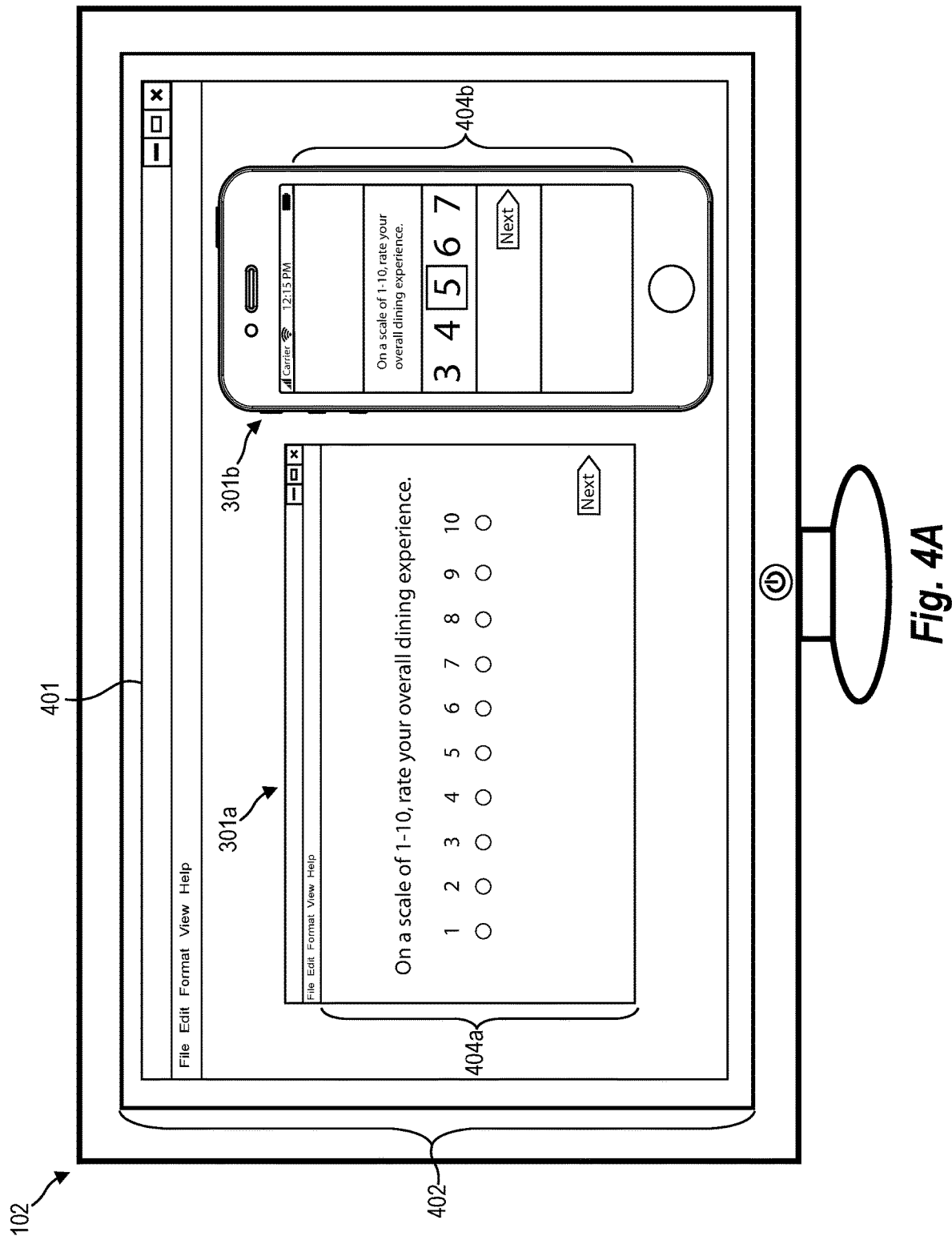
FIGS. 4A-4B illustrate an example graphical user interface showing a plurality of views of an electronic document in accordance with one or more embodiments.
Figure 4B:
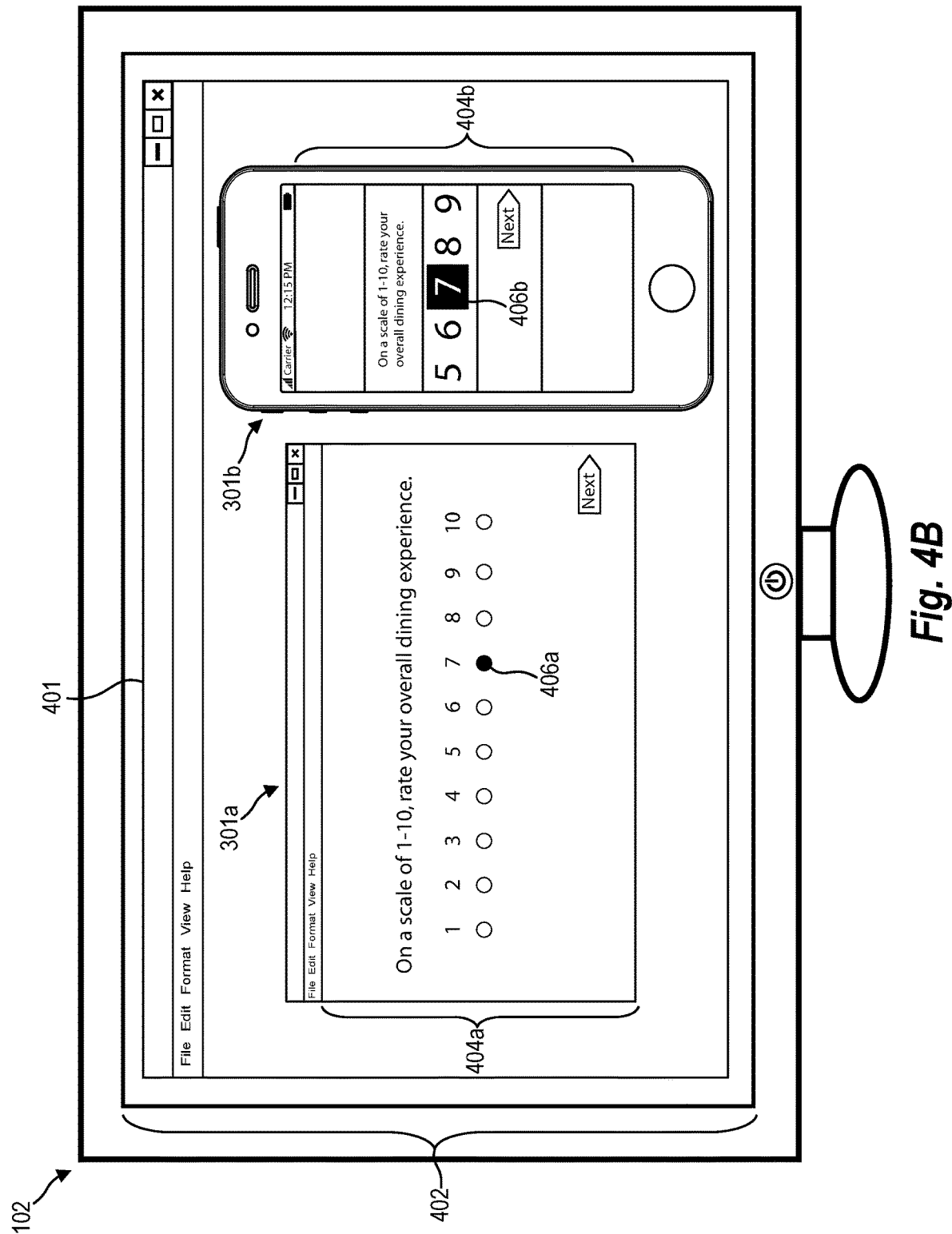

To illustrate, FIGS. 4A-4B show examples of a client device 102 and a graphical user interface 401 within a display area 402 of the client device 102. In particular, FIGS. 4A-4B illustrate an example client device 102 that may implement one or more features and functionalities described above in conjunction with the client device 102 of FIGS. 1-3. Additionally, or alternatively, the client device 102 implements one or more features and functionality described above in connection with the server device 108. As discussed below in reference to FIG. 10, other client devices (e.g., desktops, tablets, laptops, mobile devices) can implement the features and methods of various embodiments. Thus, FIGS. 4A-4B provide one example of a client device 102 and graphical user interface 401 within the display area 402 to aid in the description of various features and methods of one or more embodiments.

As illustrated, the client device 102 provides a presentation of an electronic document 211 via the graphical user interface 401 of the client device 102. More specifically, FIG. 4A illustrates a graphical user interface 401 including a desktop view 301a of an electronic survey within a first portion of the graphical user interface 401 and a mobile view 301b of the electronic survey within a second portion of the graphical user interface 401. As shown in FIG. 4A, the desktop view 301a includes a first view area 404a including a survey question that states "On a scale of 1-10, rate your overall dining experience," and includes ten corresponding answer bubble options as the survey question would appear within a graphical user interface on a desktop device. Further, the mobile view 301b includes a second view area 404b that includes the same survey question and a plurality of answer options.

As shown in FIG. 4A, the format of the electronic survey in accordance with the different views 301a-b can differ between the desktop view 301a and the mobile view 301b. For example, based on one or more dimensions or other display features of a computing device corresponding to the desktop view 301a, the electronic survey within the desktop view 301a may include a matrix-type question format including multiple selectable answer bubbles. Alternatively, based on one or more dimensions or other display features of a mobile device, the mobile view 301b may include a scroll or slider-type answer option for selecting one of the ten answer options. It is appreciated that other formats or answer options may be used based on various display features of display area, display devices, and/or document views.

Additionally, as shown in FIG. 4A, the desktop view 301a may include a presentation of a graphical user interface 301a and a view area 404a as it would appear on a desktop computer while the mobile view 301b includes a presentation of a mobile device with a corresponding graphical user interface and view area 404b. It is appreciated that the different views 301a-b may include only a corresponding view area (as opposed to a preview of a corresponding client device) or include a preview of different models of desktop and mobile devices.

In one or more embodiments, a user 106 can interact with one of the views 301a-b. For example, as shown in FIG. 4B, a user 106 may select an answer option 406a within the desktop view 301a. More specifically, FIG. 4B shows a rendering of the desktop view 301a based on a user selection of the answer option 406a of "7." As described above, the selection of the answer option 406a may correspond to a modification of a state within the model 214 and cause the model 214 to update and reflect the user selection. Further, due to the two-way binding between the views 301a-b and the associated model 214, the mobile view 301b may be updated to reflect the change of state within the model 214 and demonstrate how the user selection of the answer option 404b would appear on a mobile device corresponding to the mobile view 301b.

Additionally, as shown in FIGS. 4A-4B, the view areas 301a-b further includes a selectable "next" icon that the user 106 may select. In particular, in the case that the electronic document presentation 210 includes a presentation of an electronic survey, selecting the next icon can cause the client device 102 to request and/or access a new survey question. More specifically, in response to identifying a user selection of the next icon, the synchronization system 104 can request or access a new survey question (e.g., a new electronic document or another portion of the same electronic document) and a new model associated with the new survey question. Alternatively, in one or more embodiments, the next survey question may correspond to the same model 214 as the previous survey question.

In response to selecting the next icon, the synchronization system 104 can request a new electronic document (e.g., a new survey question) corresponding to a new model. In one or more embodiments, requesting a new electronic document can include requesting the same electronic document 211 of the electronic document presentation 210 (e.g., a default version of the electronic document 211) prior to any changes applied to the model 214. Alternatively, requesting a new electronic document can include requesting a new electronic document 211 within the electronic document presentation 210 that corresponds to the new model 214. Additionally, where the previous electronic document 211 includes one or more changes to a model 214 due to one or more user interactions, the synchronization system 104 can store a cache of the modified model 214 (e.g., using the data storage 212). As such, if the user 106 desires to return to the electronic document corresponding to the modified model 214, the synchronization system 104 can access the cached model 214 as opposed to requesting a new model.

Figure 5:
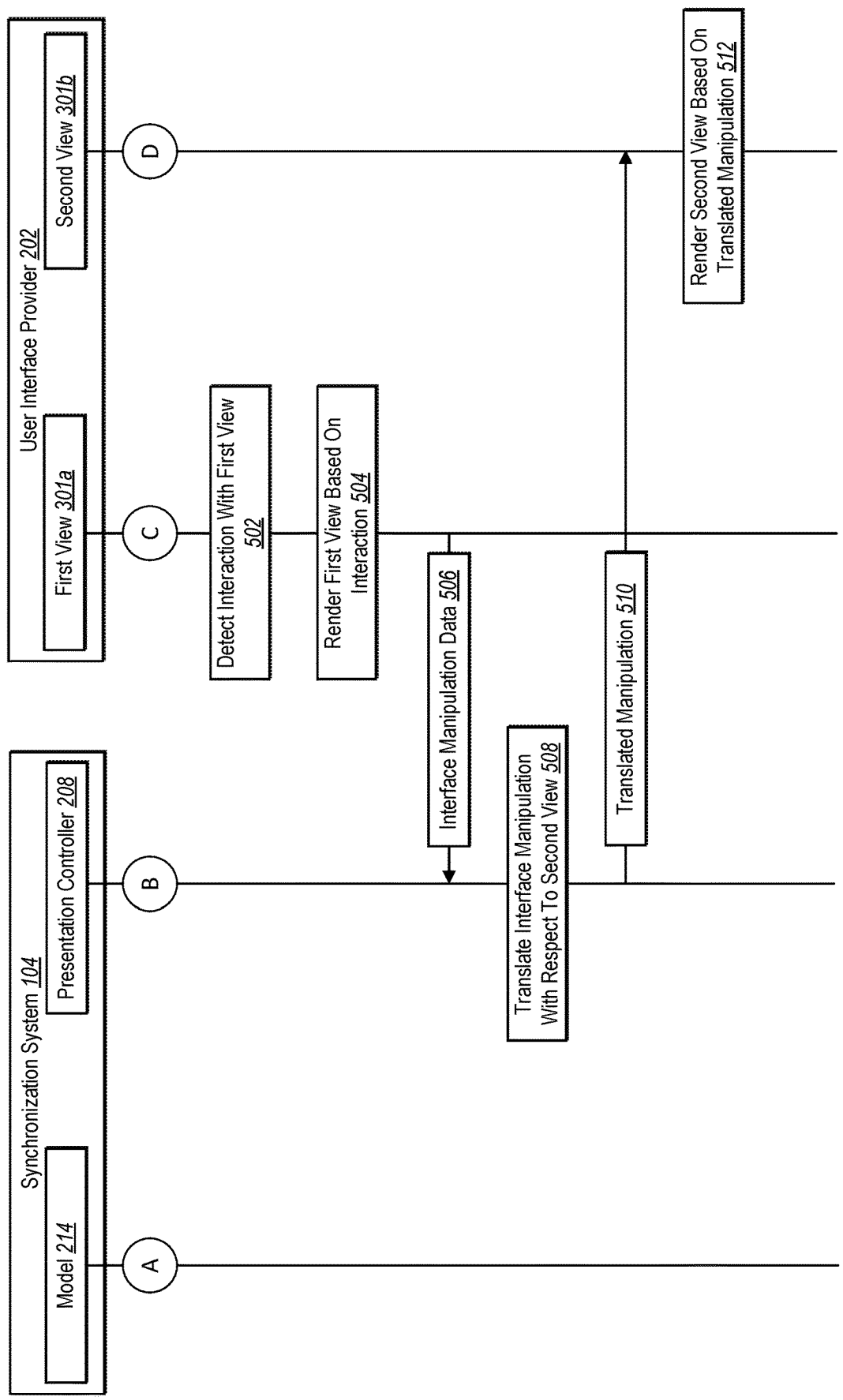
FIG. 5 illustrates a flow diagram of interactions between a synchronization system and a user interface provider in accordance with one or more embodiments.

Similar to FIG. 3, FIG. 5 illustrates a flow diagram of interactions between a synchronization system 104 and a user interface provider 202 (e.g., the synchronization system 104 and the user interface provider 202 described above in connection with FIG. 2). In particular, FIG. 5 illustrates an example embodiment of methods, processes, and/or functions of the synchronization system 104 and a user interface provider 202. Additionally, as shown in FIG. 5, the various methods, processes, and/or functions of the synchronization system 104 and the user interface provider 202 can include a continuation the various steps discussed with respect to the synchronization system 102 and the user interface provider 202 described above in connection with FIG. 3. Nevertheless, while the steps of FIG. 5 can build upon the steps of FIG. 3, it is appreciated that one or more embodiments can involve some or all of the steps included within FIGS. 3 and 5, and may exclude one or more steps from either of FIG. 3 or 5.

As illustrated in FIG. 5, the first view 301a detects 502 an interaction with the first view 302a. In one or more embodiments, the interaction with the first view 302a includes a user interaction in which one or more values or states of the model 214 are not modified. As an example, the interaction with the first view 302a may include a user manipulation of a graphical user interface associated with the first view 302a. Examples of user manipulations may include scrolling, zooming in, zooming out, rotating, panning, or other manipulation of a graphical user interface associated with the first view 301a, where the user manipulation does not necessarily modify the electronic document 211 or values of the corresponding model 214. In the case that the electronic document presentation 210 includes a presentation of an electronic survey, a manipulation of the graphical user interface may include scrolling from a first survey question to a second survey question. Another example may include scrolling through a portion of a survey question.

In response to detecting the interaction with the first view, the first view 301a can render 504 the first view 301a based on the interaction. For example, in response to a scrolling interaction, the first view 301a may render the scrolling interaction by manipulating a graphical user interface to provide a different portion of the electronic document 211 in accordance with the scrolling interaction. For instance, in the case that the electronic document 211 includes an electronic survey, the first view 301a may scroll from a first survey question to a second survey question or, alternatively, from a first point of reference within the survey question to another point of reference within the same or different survey question. Additionally, while FIG. 5 illustrates one embodiment in which a user interaction is performed with respect to the first view 301a, it is appreciated that the user interaction may be performed with respect to the second view 301b. In response, the second view 301b would render the user interaction in accordance with the user interaction.

As shown in FIG. 5, in response to detecting the interaction and rendering the first view based on the interaction, the user interface provider 202 can provide 506 interface manipulation data to the synchronization system 102. In particular, the first view 301a can provide the interface manipulation data to the presentation controller 206 to interpret the user interaction with respect to the first view 301a. For example, the presentation controller 206 can monitor the first view 301a to intercept or otherwise access any changes to the first view 301a and determine what user interactions are performed with respect to the first view 301a.

The presentation controller 206 can further translate 508 the interaction or interface manipulation. In particular, the presentation controller 206 can translate a user interaction or interface manipulation with respect to the first view 301a to a corresponding user interaction or graphical user interface manipulation for the second view 301b. For example, where the user interaction includes a user manipulation of a graphical user interface, the presentation controller 206 can determine a percentage of the electronic document 211 that the manipulation of the graphical user interface represents. As an example, where a scrolling interaction causes the graphical user interface to shift down and scroll across 50% of the electronic document 211, the presentation controller 206 may translate the interface manipulation as a 50% scroll of the electronic document 211. As such, the presentation controller may determine that a corresponding scrolling interaction for the second view 301b would include a scroll across 50% of the electronic document 211, whether or not the total distance or number of pixels scrolled would differ between the first view 301a and the second view 301b.

As shown in FIG. 5, the synchronization system 104 provides 510 the translated manipulation (or translated interaction) to the second view 301b. In particular, after translating the manipulation with respect to the first view 301a to a corresponding manipulation of the second view 301b, the presentation controller 206 applies the translated manipulation to the second view 301b. Additionally, as shown in FIG. 5, the user interface provider 202 renders 512 the second view 301b based on the translated manipulation. In particular, the second view 301b provides a presentation of the user interaction within the second view 301b to reflect how the interaction with the first view 301a would appear within the second view 301b. For example, where the first view 301a is a desktop view and the second view 301b is a mobile view, rendering the second view 301b would include providing a visualization of the user interaction with respect to the desktop view as the user interaction (e.g., a translated interaction) would appear within the mobile view.

Figure 6A:
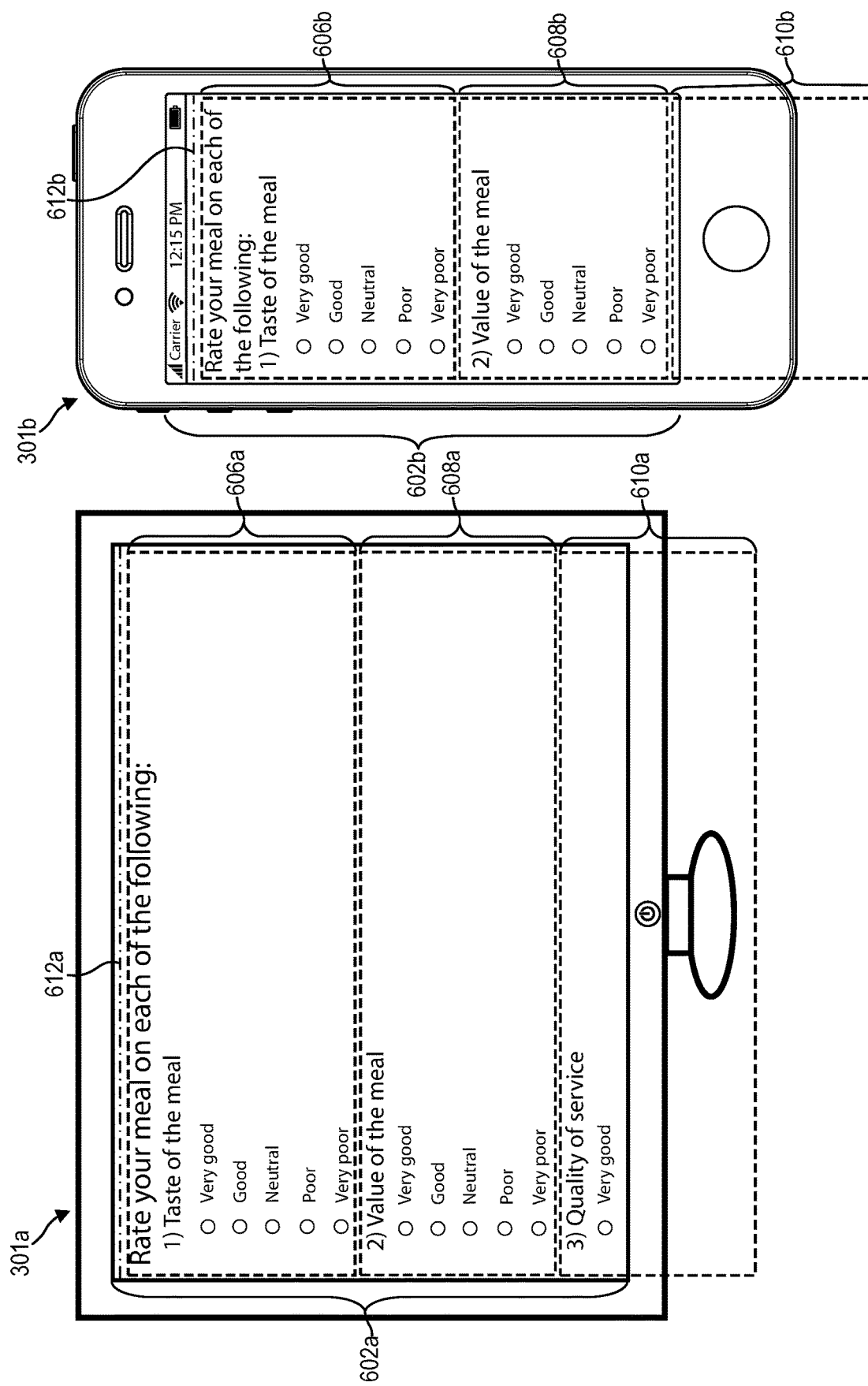
FIGS. 6A-6B illustrate an example graphical user interface showing a plurality of views of an electronic document in accordance with one or more embodiments.
Figure 6B:
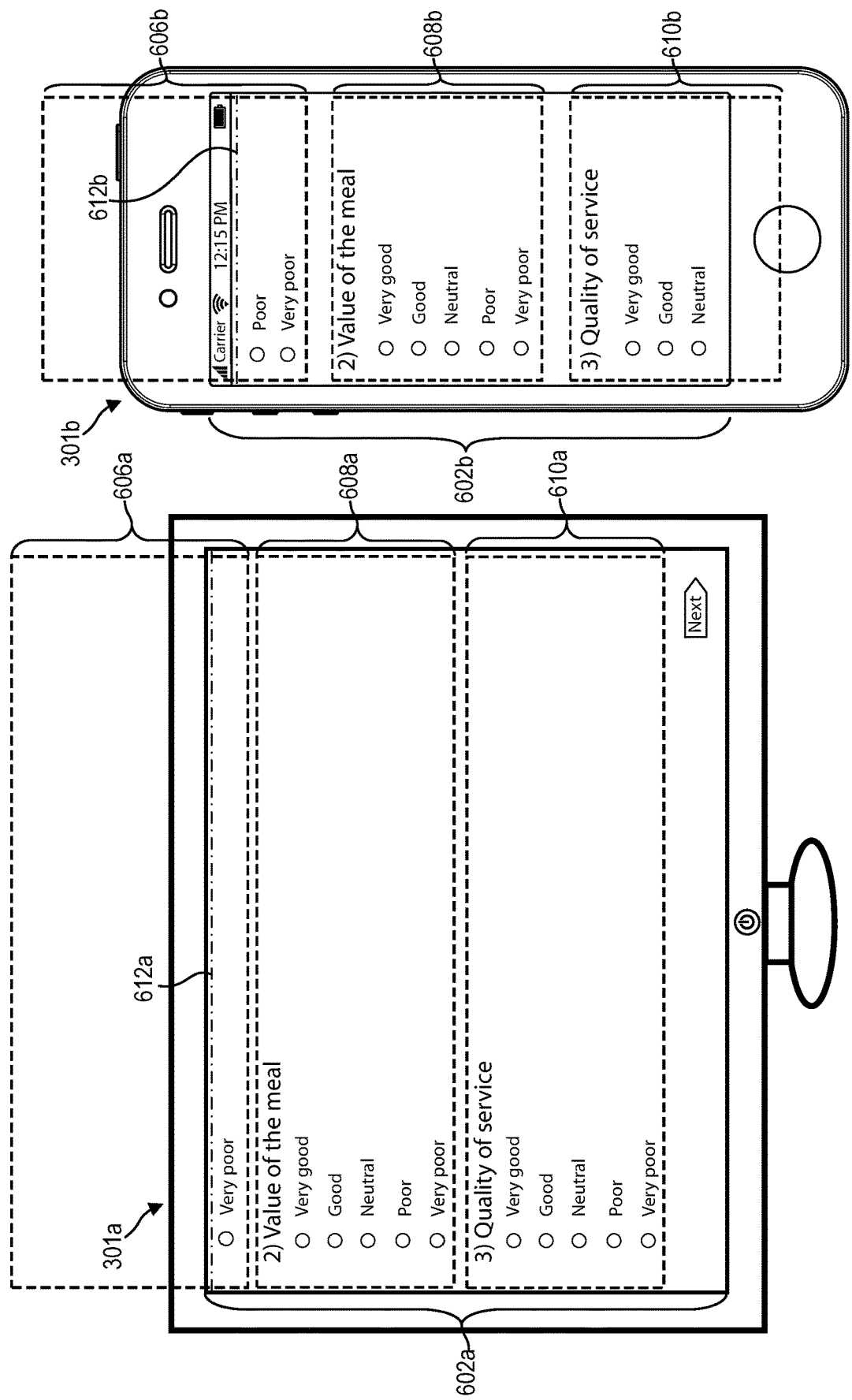

To illustrate, FIGS. 6A-6B show examples of views 301a-b that may be provided within a graphical user interface of a client device 102. In particular, FIGS. 6A-6B illustrate example views 301a-b that may include one or more features and functionalities described above in conjunction with the other figures. Specifically, FIGS. 6A-6B illustrate example views 301a-b of an electronic survey and a translation of one or more user interactions with respect to the views 301a-b.

As shown, FIG. 6A illustrates a desktop view 301a and a mobile view 301b within a graphical user interface of a client device 102. In particular, FIG. 6A illustrates a desktop view 301a and a mobile view 301b including presentations of an electronic survey including multiple survey questions. For example, the desktop view 301a includes a graphical user interface 602a including a presentation of content of the electronic survey. Further, the mobile view 301b includes a graphical user interface 602b including a presentation of content of the electronic survey. While not shown in FIG. 6A, the desktop view 301a and the mobile view 301b may be included within respective portions of a graphical user interface on the client device 102.

In one or more embodiments, the server device 108 and/or client device 102 divides an electronic document 211 (or portion of an electronic document 211) into multiple sections. For example, in one or more embodiments, the synchronization system 104 logically breaks up the electronic document 211 into multiple sections. As shown in FIG. 6A, the electronic survey presented within the desktop view 301a includes into a first section 606a, a second section 608a, and a third section 610a. Additionally, the electronic survey presented within the mobile view 301b includes a first section 606b, a second section 608b, and a third section 610b. Each of the sections can correspond to a survey question including one or more headers and each of the corresponding answer options. As an alternative, one or more embodiments of the synchronization system 104 view the entire document 211 as a single section without dividing up the electronic document 211 into subsections.

Additionally, while one or more of the sections may appear within the views 301a-b, some or all of the sections may not appear within a corresponding graphical user interface 602a-b. For example, the first view 301a includes a display of each of the first section 606a and the second section 608a of the electronic survey presentation, but only includes a portion of the third section 610a within the graphical user interface 602a. Further, the mobile view 301b includes a complete presentation of the first section 606b and the second section 608b, but fails to include any of the third section 610b within the graphical user interface 602b.

Further, as shown in FIG. 6A, the desktop view 301a includes a point of reference 612a corresponding to a reference within the graphical user interface 602a that the synchronization system 104 uses to track a position within the electronic survey provided within the desktop view 301a. Additionally, the mobile view 301b includes a point of reference 612b corresponding to a reference within the graphical user interface 602b that tracks a position within the electronic survey provided within the mobile view 301b. In one or more embodiments, the views 301a-b include a visual indication of the points of reference 612a-b. Alternatively, the points of reference 612a-b may be transparent (e.g., invisible) to a user 106 and not appear within the respective views 301a-b. Further, while FIGS. 6A-6B show the points of reference 612a-b across the top of the graphical user interfaces 602a-b, it is appreciated that the point of references may be located at any point within the graphical user interfaces 602a-b of each respective view 301a-b.

As mentioned above, the synchronization system 104 can use the points of reference 612a-b to track a position of the electronic survey or portion of an electronic survey provided within the respective views 301a-b. In particular, as shown in FIG. 6A, the first point of reference 612a for the desktop view 301a corresponds to an equivalent point of reference 612b for the mobile view 301b. Additionally, the first point of reference 612a and the second point of reference 612b each correspond to equivalent points within the electronic survey that appears within the graphical user interfaces 602a-b of the respective views 301a-b.

As described above, upon identifying a user interaction with respect to the desktop view 301a that manipulates the desktop view 301a, the synchronization system 104 can translate the manipulation of the desktop view 301a to a corresponding manipulation for the mobile view 301b. For example, FIG. 6B illustrates one embodiment of a user interaction with the desktop view 301a and a translated manipulation with respect to the mobile view 301b. In particular, FIG. 6B illustrates a scrolling interaction that manipulates the graphical user interface 602a of the desktop view 301a and a corresponding translated scrolling interaction that similarly manipulates the graphical user interface 602b of the mobile view 301b.

For example, FIG. 6B illustrates a desktop view 301a showing the result of a scrolling interaction in which a user 106 scrolls through a portion or percentage of the electronic survey (or defined section within the electronic survey). In particular, the desktop view 301a reflects the result of a user 106 scrolling across 75% of the first section 606a of the electronic survey. As a result of the scrolling interaction, a portion of the first section 606a no longer appears within the graphical user interface 602a for the desktop view 301a. Additionally, where a portion of the third section 610a did not appear within the graphical user interface 602a shown in FIG. 6A, the entire third section 610a appears within the graphical user interface 602a shown FIG. 6B as a result of the scrolling interaction.

As shown in FIG. 6B, the mobile view 301b provides an updated view of the electronic survey based on the scrolling interaction with respect to the desktop view 301a. In particular, the mobile view 301b provides an updated view in accordance with a translated scrolling interaction of the interaction with the desktop view 301a in which a user 106 scrolled across 75% of the first section 606a of the electronic survey. Similar to the desktop view 301a, the mobile view 301b reflects a translated scrolling interaction across 75% of the first section 606b of the electronic survey. Additionally, the desktop view 301a and mobile view 301b can reflect a 75% scroll across the first sections 606a-b with reference to the point of references 612a-b for each of the desktop view 301a and the mobile view 301b.

As shown in FIG. 6B, the modified mobile view 301b in accordance with the scrolling interaction includes a presentation of the survey question in which 75% of the first section 606b is not shown within the graphical user interface 602b of the mobile view 301b. Additionally, because of the limited display area of the mobile view 301b, only a portion of the third section 610b appears within the graphical user interface 602a of the mobile view 301b in contrast to the entire third section 610a appearing within the graphical user interface 602a of the desktop view 301a. Additionally, while FIG. 6B shows one embodiment of a desktop view 301a and a mobile view 301b, one or more embodiments may include other types of views including, for example, a tablet view, or other types or models of mobile devices having different display features. Additionally, in one or more embodiments, a document view 218 may correspond to a view of the electronic document 211 as the electronic document 211 would appear across multiple display devices (e.g., multiple screens for a single client device).

In one or more embodiments, the view management system 100 may include multiple client devices that each provide a presentation of one or more views 218 of an electronic document 211 in accordance with one or more principles described herein. For example, as shown in FIG. 7, a view management system 100 includes multiple client devices 102a-c that each have a synchronization system 104a-c similar to other synchronization systems 104 described herein. Additionally, similar to FIG. 1, the view management system 100 can include a user 106 associated with each of the multiple client devices 102a-c, a server device 108 having a presentation system 110 thereon and a network 112 over which the client devices 102a-c and the server device 108 may communicate.

Similar to the client device 102 described above in connection with FIG. 1, each of the client devices 102a-c can include one of various types of client devices. In one or more embodiments, each of the client devices 102a-c include a different type of client device. As an example, the first client device 102a can be a desktop computer, the second client device 102b can be a tablet, and the third client device 102c can be a mobile device (e.g., a smart phone). Alternatively one or more of the client devices 102a-c can include a similar or identical type of client device as one or more of the other client devices 102a-c. As an example, the first client device 102a may be a desktop computer while the second client device 102b is a tablet, and the third client device 102c is a mobile phone.

Additionally, the view management system 100 can cause one or more of the client devices 102a-c to present and synchronize one or more views 218 of an electronic document 211. For example, the server device 108 can provide an electronic document presentation 210, including an electronic document 211, a corresponding model 214, and associated views 218, to the client devices 102a-c for presenting the electronic document 211 in accordance with a view 218 particular to each of the client devices 102a-c. In particular, upon receiving the electronic document presentation 210, the first client device 102a can provide a presentation of the electronic document 211 in accordance with a desktop view, while the second client device 102b provides a presentation of the electronic document 211 in accordance with a tablet view, and the third client device 102c provides a presentation of the electronic document 211 in accordance with a mobile phone view.

Additionally, similar to other embodiments described herein, the synchronization systems 104a-c on the respective client devices 102a-c can bind one or more views 218 with the associated model 214 corresponding to the electronic document presentation 210 provided to each of the client devices 102a-c. For example, synchronization system 104 on the first client device 102a can bind a desktop view to the model 214. Additionally, the synchronization system 104 on the second client device 102b can bind a tablet view to the model 214, while the synchronization system 104 on the third client device 102c binds a mobile phone view to the model 214. As such, each of the client devices 102a-c can establish a two-way binding between the model 214 and one or more views accessible to the client devices 102a-c.

Additionally, in one or more embodiments, the synchronization systems 104 can establish a two-way binding between the views 218 on the respective client devices 102a-c and a master model maintained at the server device 108. As such, any changes to the model 214 and/or interactions with respect to a particular view may be applied to the master model and synchronized across multiple views 218 on the different client devices 102a-c.

In facilitating synchronization across multiple devices, the presentation system 110 on the server device can establish a document session corresponding to the electronic document presentation 210 provided to each of the client devices 102a-c. In particular, the presentation system 110 can assign a session ID for the electronic document presentation 210. Additionally, the presentation system 110 can maintain a master model for the electronic document presentation 210 at the server device 108. For example, the presentation system 110 can generate and maintain a master model that is synchronized to a corresponding model 214 and/or corresponding views 218 included within the electronic document presentation(s) 210 provided to each of the client devices 102a-c.

The view management system 100 can use the master model and bound views 218 to synchronize views 218 across the client devices 102a-c. For example, where a user 106 interacts with a desktop view on the first client device 102a and causes one or more values and/or states of a corresponding model 214 to change, the first client device 102a can provide the changes to the model 214 to the server device 108. The presentation system 110 can update the master model to reflect the changes to the model 214 and provide any changes to the second client device 102b and the third client device 102c to apply to respective models 214 and views 218. As such, the synchronization system 104b on the second client device 102b can apply the changes made with respect to the desktop view to a tablet view, and in addition, the synchronization system 104c on the third client device 102c can apply the changes made with respect to the desktop view to a mobile phone view.

In one or more embodiments, the view management system 100 can provide one or more synchronized views 218 of an electronic document 211 on different client device 102 through the use of one or more visual identifiers (e.g., QR codes). For example, where the user 106 has a desktop computer (e.g., the first client device 102a) and a tablet (e.g., the second client device 102b), the synchronization system 104 on the desktop computer can provide a QR code within a graphical user interface of the desktop computer in conjunction with a desktop view of the electronic document 211. Using the tablet, the user 106 can scan the QR code, access the server device using the QR code to identify a particular session ID and corresponding electronic document presentation 210, and receive an electronic document presentation 210 including an updated model 214 in accordance with the electronic document 211 presented via the desktop computer. As such, the tablet can provide a tablet view of the electronic document 211 that is synchronized with the desktop view on the desktop computer. It is appreciated that a mobile phone (e.g., the third client device 102c) could similarly provide a synchronized mobile view of the electronic document presentation 210 using the QR code provided within a graphical user interface on the desktop computer.

Figure 8:
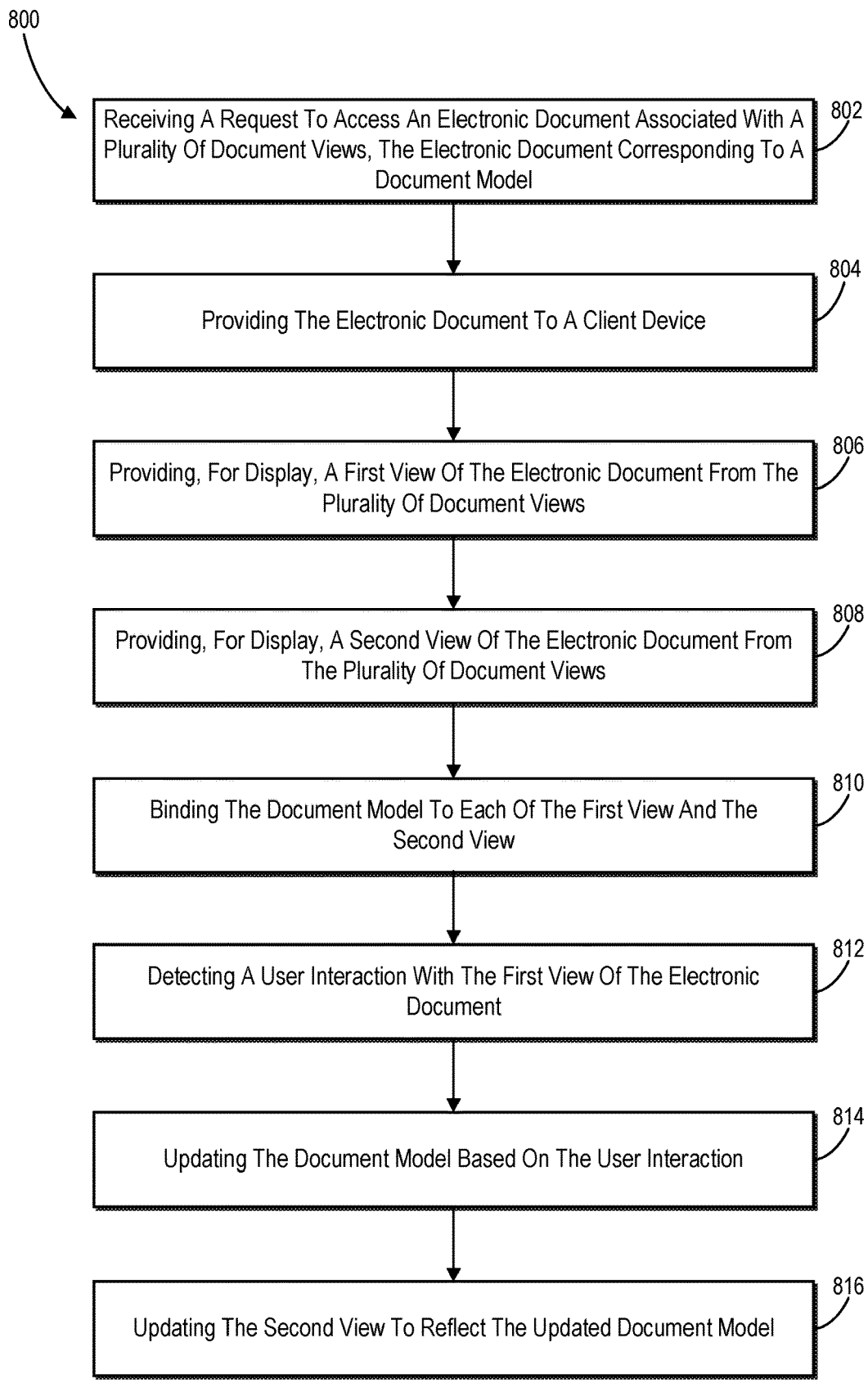
FIG. 8 illustrates a flowchart of a series of acts in a method for presenting views of electronic content in accordance with one or more embodiments.
Figure 9:
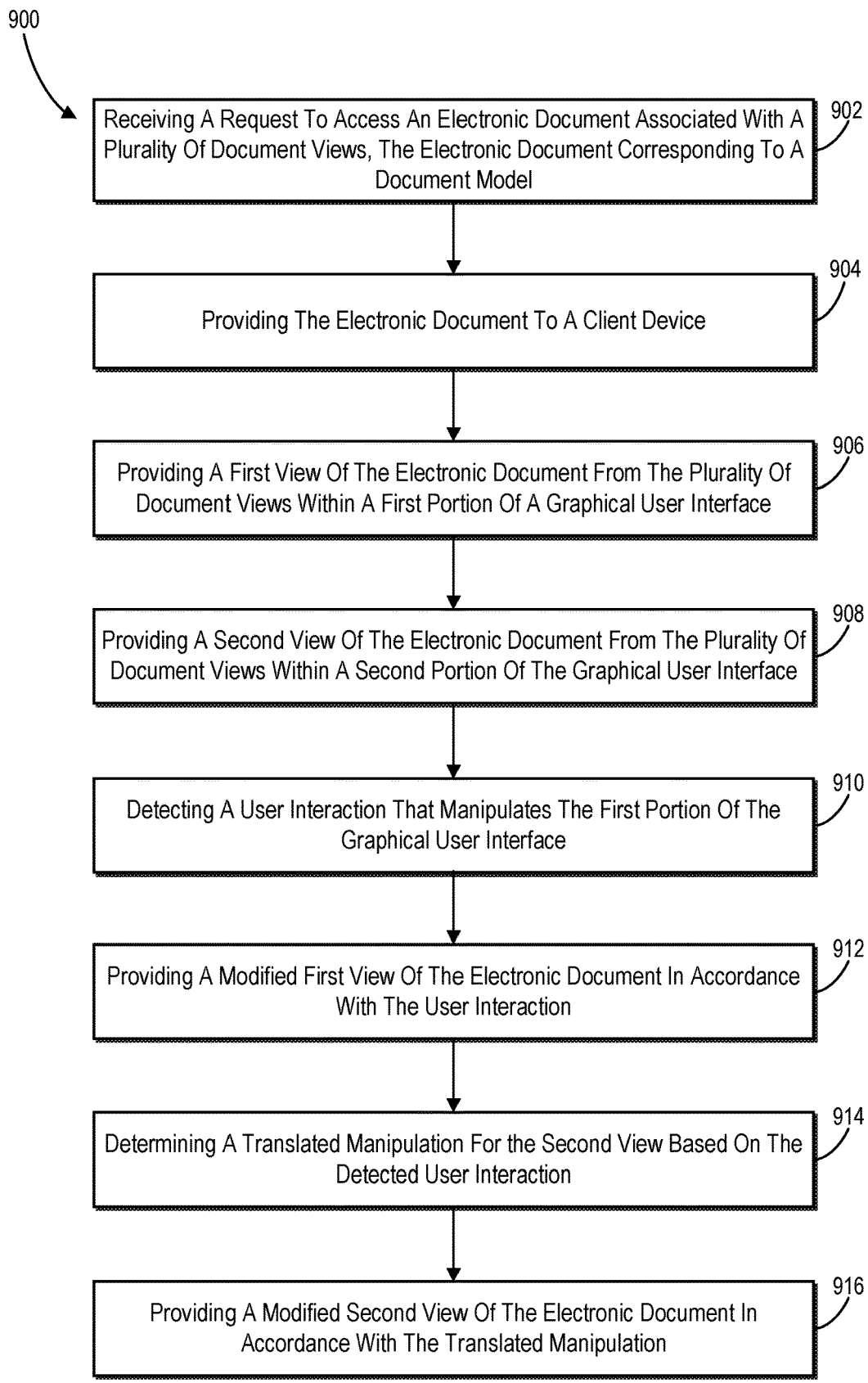
FIG. 9 illustrates a flowchart of a series of acts in a method for presenting views of electronic content in accordance with one or more embodiments.

FIGS. 1-7, the corresponding text, and the examples, provide a number of different systems, devices, and graphical user interfaces for presenting synchronized views of an electronic document 211. In addition to the foregoing, embodiments disclosed herein also can be described in terms of flowcharts comprising acts and steps in a method for accomplishing a particular result. For example, FIGS. 8-9 illustrate flowcharts of exemplary methods in accordance with one or more embodiments disclosed herein. The methods described in relation to FIGS. 8-9 can be performed with less or more steps/acts or the steps/acts can be performed in differing orders. Additionally, the steps/acts described herein can be repeated or performed in parallel with one another or in parallel with different instances of the same or similar steps/acts.

FIG. 8 illustrates a flowchart of an example method 800 for presenting and synchronizing views of an electronic document in accordance with one or more embodiments disclosed herein. While FIG. 8 illustrates example steps according to one embodiment, other embodiments may omit, add to, reorder, and/or modify any of the steps shown in FIG. 8. One or more steps shown in FIG. 8 may be performed by any of the components illustrated in the system 100 illustrated in FIGS. 1 and 7. Further, one or more steps of the method 800 may be performed by a client device 102, server device 108, or combination of both.

As illustrated in FIG. 8, the method 800 includes an act 802 of receiving a request to access an electronic document 211 associated with a plurality of document views 218. For example, the act 902 can involve receiving, from a client device 102, a request to access an electronic document 211 associated with a plurality of document views 218, the electronic document 211 corresponding to a document model 214. In one or more embodiments, the act 802 of receiving the request to access the electronic document 211 involves receiving a request to access an electronic document presentation 210 including the electronic document 211, document model(s) 214, and document views 218.

Additionally, as shown in FIG. 8, the method 800 includes an act 804 of providing the electronic document 211 to a client device 102. For example, the act 804 can involve providing, to the client device 102, the electronic document 211, wherein providing the electronic document 211 to the client device 102 causes the client device 102 to perform one or more steps of the method 800. In one or more embodiments, the act 802 of providing the electronic document 211 involves providing an electronic document presentation 210 including the electronic document 211, document model(s) 214, and document views 218. The act 804 of providing the electronic document 211 may involve downloading or otherwise transmitting the electronic document 211 to the client device 102 over a network 112. In one or more embodiments, the act 804 involves providing the associated views 218 and document model 214 to the client device 102. Additionally, in one or more embodiments, providing the electronic document 211 to the client device 102 causes the client device to perform one or more functions with respect to the electronic document 211. For example, in one or more embodiments, providing the electronic document 211 to the client device 102 causes the client device to perform each of the acts 806-816 of the method 800.

Further, as shown in FIG. 8, the method 800 includes an act 806 of providing, for display, a first view 301a of the electronic document 211 from the plurality of document views 218. Additionally, the method 800 includes an act 808 of providing, for display, a second view 301b of the electronic document 211 from the plurality of document views 218. In one or more embodiments, the first view 301a includes a desktop view. Additionally, the second view 301b can include a mobile view. Alternatively, one or more of the views 218 can include a tablet view, laptop view, or other view corresponding to a particular display area and/or client device. For example, the plurality of views 218 can include any number of views 218 corresponding different devices. For instance, the plurality of views 218 can include multiple views 218 corresponding to different types of mobile devices (e.g., smart phones).

In one or more embodiments, acts 806 and 808 involve providing the first view 301a and the second view 301b simultaneously for display. For example, providing the electronic document 211 to the client device 102 can cause the client device 102 to simultaneously provide the first view 301a (e.g., a desktop view) and the second view 301b (e.g., a mobile view) for display on the client device 102. Alternatively, acts 806 and 808 may involve providing the first view 301a and the second view 301b for display on different devices. For example, act 806 may involve providing the first view 301a (e.g., the document view) of the electronic document 211 for display within a first graphical user interface on the client device. Additionally, act 808 may involve providing the second view 301b (e.g., the mobile view) of the electronic document 211 for display within a second graphical user interface on another client device (e.g., a mobile device).

Further, as shown in FIG. 8, the method 800 includes an act 810 of binding the document model 214 to each of the first view 301a and the second view 301b. The act 810 may involve binding the document model 214 to any number of the plurality of views 218. In one or more embodiments, act 810 involves associating a reference between the document model 214 and each of the first view 301a and the second view 301b. Further, the reference establishes a two-way binding between the document model 214 and each of the first view 301a and the second view 301b such that any changes to the document model 214 will be applied to each of the first view 301a and the second view 301b. Additionally, one or more changes to the document model 214 can apply to each of the plurality of views 218 that are bound to the document model 214.

As illustrated in FIG. 8, the method 800 includes an act 812 of detecting a user interaction with the first view 301a of the electronic document 211. The act 812 may involve detecting a modification of the document model 214 via the first view 301a of the electronic document 211. Additionally or alternatively, act 812 may involve detecting state (e.g., model state 216) change within the document model 214. For example, where the electronic document 211 includes an electronic survey, act 812 may involve detecting a user selection of an answer option within the electronic survey 211 that changes a model state 216 corresponding to the answer option.

Additionally, as illustrated in FIG. 8, the method 800 includes an act 814 of updating the document model 214 based on the user interaction. For example, in response to a user selecting an answer option, a model state 216 may change from "not selected" to "selected" thus modifying the model 214 to reflect the user interaction. Further, as shown in FIG. 8, the method 800 includes an act 816 of updating the second view 301b to reflect the updated document model 214. For example, in response to updating the document model 214, and based on the document model 214 being bound to each of the first view 301a and the second view 301b, the act 816 can involve updating the second view 301b to reflect the updated document model 214. In one or more embodiments, the act 816 of updating the second view 301b involves updating the second view 301b to reflect the updated document model 214 in response to updating the document model 214 (e.g., detecting an update of the document model 214) based on the user interaction (e.g., with the first view 301a).

Additionally, while not shown in FIG. 8, the method 800 can further include an act of providing an updated first view 301a of the electronic document 211 in accordance with the updated document model 214. Additionally, the method 800 can include an act of providing an updated second view 301b of the document model in accordance with the updated document model 214. In one or more embodiments, the updated first view 301a is provided within a first portion of a graphical user interface. Additionally, the updated second view 301b can be provided within a second portion of the graphical user interface. For example, in response to updating the document model 214, the client device 102 can simultaneously provide the updated first view 301a and the updated second view 301b within a graphical user interface on the same client device 102.

Moreover, in one or more embodiments, the method 800 can include an act of providing a visual identifier to the client device 102. The visual identifier may be associated with a session identification for a document session associated with the document model 214. In one or more embodiments, the visual identifier is a quick response (QR) code. The visual identifier may be provided within a portion of a graphical user interface corresponding to the first view 301a and/or the second view 301b.

The method 800 can further include an act of receiving a request to access the document session from a mobile device. The request to access the document session can include the session identification associated with the visual identifier. For example, receiving the request may include receiving the session identification based on a scan of the QR code (or other visual identifier) by the mobile device. Additionally, the method 800 can include providing a mobile view of the electronic document from the plurality of document views 218 based on one or more display features of the mobile device. Further, the method 800 can include an act of providing an updated model 214 to the mobile device. Providing the updated model 214 to the mobile device can cause the mobile device to provide the mobile view of the electronic document in accordance with the updated document model 214.

FIG. 9 illustrates a flowchart of another example method 900 for presenting and synchronizing views of an electronic document 211 in accordance with one or more embodiments disclosed herein. While FIG. 9 illustrates example steps according to one embodiment, other embodiments may omit, add to, reorder, and/or modify any of the steps shown in FIG. 9. One or more steps shown in FIG. 9 may be performed by any of the components illustrated in the system 100 illustrated in FIGS. 1 and 7. Further, one or more steps of the method 900 may be performed by a client device 102, server device 108, or combination of both.

As illustrated in FIG. 9, the method 900 includes an act 902 of receiving a request to access an electronic document 211 associated with a plurality of document views 218. For example, the act 902 can involve receiving, from a client device 102, a request to access an electronic document 211 associated with a plurality of document views 218, the electronic document 211 corresponding to a document model 214. Act 902 can include similar features and functionality as act 802 described above in connection with FIG. 8.

Additionally, as shown in FIG. 9, the method 900 includes an act 904 of providing the electronic document 211 to a client device 102. For example, the act 904 can involve providing, to the client device 102, the electronic document 211, wherein providing the electronic document 211 to the client device 102 causes the client device 102 to perform one or more steps of the method 900. For example, in one or more embodiments, the act 904 of providing the electronic document 211 to the client device 102 causes the client device 102 to perform each of the acts 906-916 of the method 900.

Further, as shown in FIG. 9, the method 900 includes an act 906 of providing a first view 301a of the electronic document 211 from the plurality of document views 218 within a first portion of a graphical user interface. For example, the act 906 can involve providing, within a first portion of a graphical user interface, a first view 301a of the electronic document 211 from the plurality of document views 218. Additionally, as shown in FIG. 9, the method 900 includes an act 908 of providing a second view 301b of the electronic document 211 from the plurality of document views 218 within a second portion of the graphical user interface. For example, the act 908 can involve providing, within a second portion of the graphical user interface, a second view 301b of the electronic document 211 from the plurality of document views 218.

Additionally, as shown in FIG. 9, the method 900 includes an act 910 of detecting a user interaction that manipulates the first portion of the graphical user interface. Examples of user interactions that manipulate a portion of a graphical user interface may include scrolling, zooming in, zooming out, rotating, panning, or other manipulation of a graphical user interface. Additionally, the method 900 includes an act 912 of providing a modified first view 301a of the electronic document 211 in accordance with the user interaction. For example, the act 912 can involve providing, within the first portion of the graphical user interface, a modified first view 301a of the electronic document 211 in accordance with the user interaction. Where the user interaction includes a scrolling interaction, act 912 may involve causing the first view 301a to display a different portion of the electronic document 211 within the first portion of the graphical user interface. As an example, a user 106 may scroll down and cause the first view 301a to shift a display of the electronic document 211 in accordance with the scroll down interaction.

As shown in FIG. 9, the method 900 includes an act 914 of determining a translated manipulation for the second view 301b based on the detected user interaction. For example, act 914 may involve determining a manipulation of a second portion of the graphical user interface that corresponds to a manipulation of the first portion of the graphical user interface caused by the user interaction. For instance, where the user 106 manipulates a graphical user interface by scrolling down a portion of an electronic document 211 within the first view 301a, act 914 can involve determining a translated manipulation for the second view 301b the corresponds to the scrolling down interaction that the user 106 performed with respect to the second view 301a. As shown in FIG. 9, the method 900 can further include an act 916 of providing a modified second view 301b of the electronic document 211 in accordance with the translated manipulation. For example, the act 916 may involve providing a display within the second portion of the graphical user interface that provides the second view 301b in accordance with the translated manipulation based on the detected user interaction with respect to the first view 301a.

Additionally, while not shown in FIG. 9, the method 900 can include an act of defining a plurality of sections within the electronic document 211. For example, where the electronic document 211 includes an electronic survey, each of the plurality of sections can correspond to a different survey question within the electronic survey. Additionally, detecting a user interaction that manipulates a first portion of the graphical user interface can include detecting a user interaction with respect to at least one section of the plurality of sections of the electronic document 211.

In one or more embodiments of the method 900, the user interaction that manipulates the first portion of the graphical user interface includes a scrolling interaction that causes the first view 301a of the electronic document 211 to shift a display of the electronic document 211 within the first portion of the graphical user interface. Additionally, determining the translated manipulation for the second view 301b based on the detected user interaction can include determining that the display of the electronic document 211 within the first portion of the graphical user interface has shifted by a percentage of the at least one section of the electronic document 211. Further, providing the modified second view 301b of the electronic document 211 in accordance with the translated manipulation can include causing a display of the electronic document 211 within the second view 301b to shift by the percentage of a corresponding section to the at least one section of the electronic document 211 within the second view 301b. For example, where a user 106 scrolls through a first section of an electronic document 211 by 50% within the first view 301a, the method 900 can include an act of causing the second view 301b to scroll through the second section of the electronic document 211 by 50% within the second view 301b.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
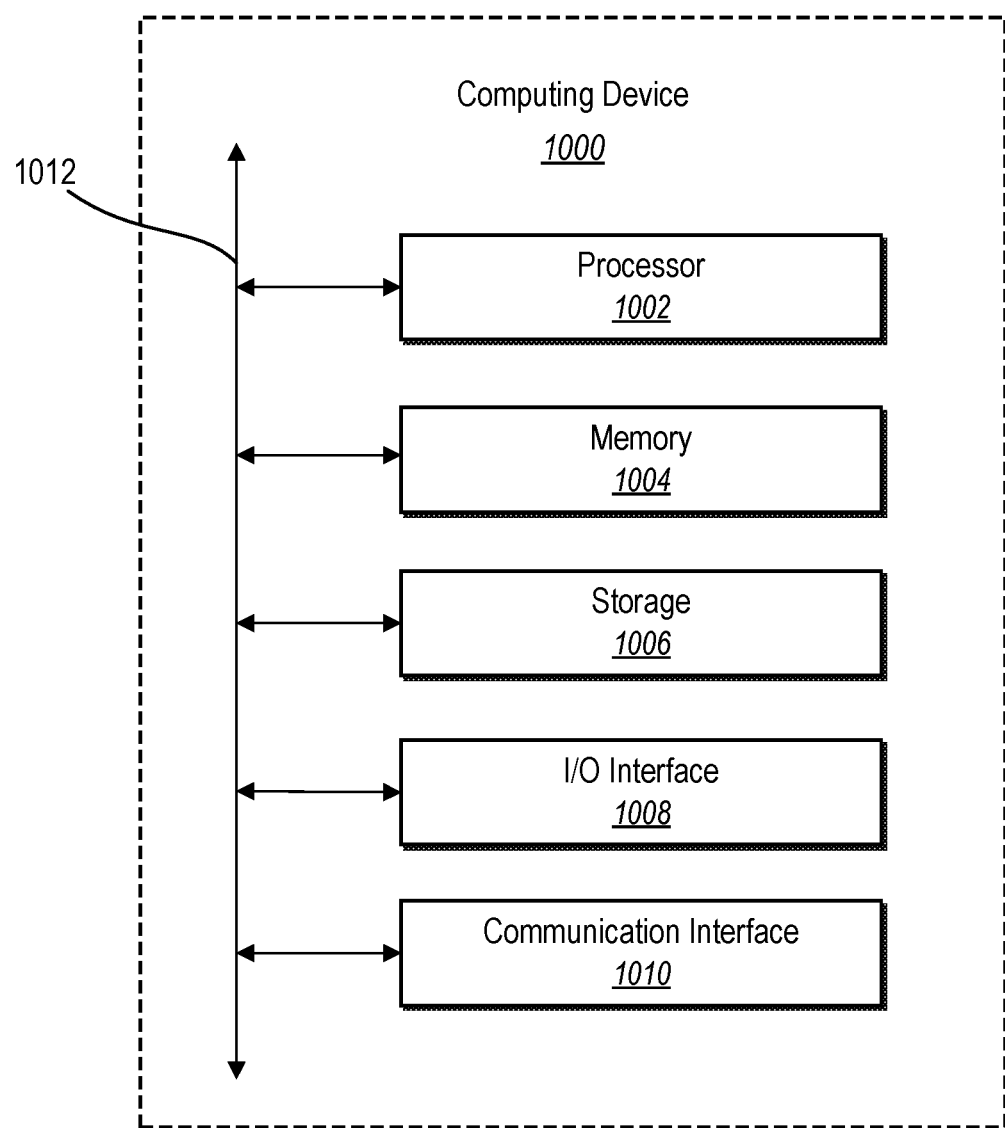
FIG. 10 illustrates a block diagram of a computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the server device 101 and/or client device 102. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
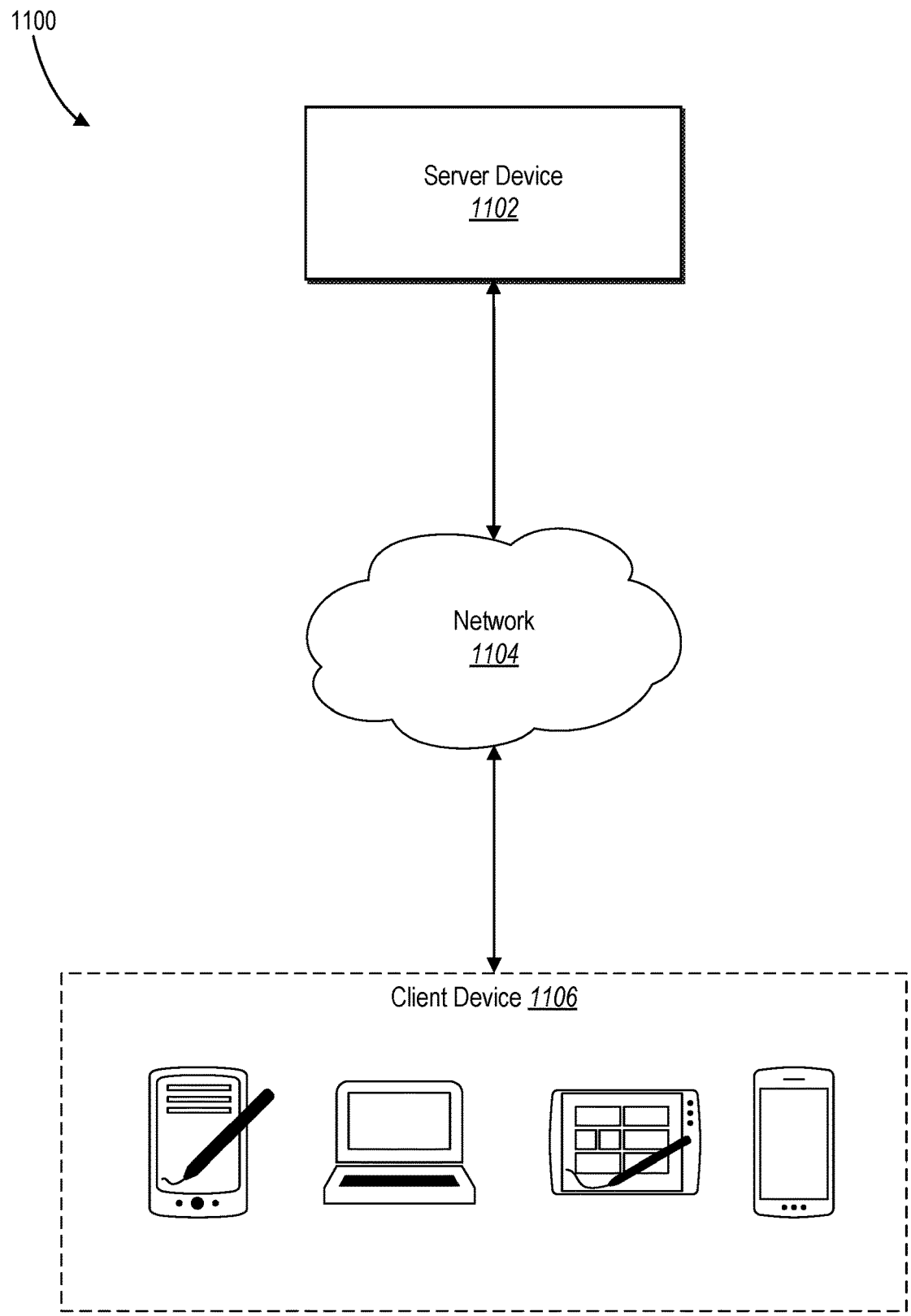
FIG. 11 illustrates a networking environment of a survey system in accordance with one or more embodiments.

FIG. 11 illustrates an example network environment 1100 of a view management system 100. Network environment 1100 includes a client device 1106, and a server device 1102 connected to each other by a network 1104. Although FIG. 11 illustrates a particular arrangement of client system 1106, server device 1102, and network 1104, this disclosure contemplates any suitable arrangement of client device 1106, server device 1102, and network 1104. As an example and not by way of limitation, two or more of client device 1106, and server device 1102 may be connected to each other directly, bypassing network 1104. As another example, two or more of client device 1106 and server device 1102 may be physically or logically co-located with each other in whole, or in part. Moreover, although FIG. 11 illustrates a particular number of client devices 1106, survey systems 902, and networks 1104, this disclosure contemplates any suitable number of client devices 1106, survey systems 902, and networks 1104. As an example and not by way of limitation, network environment 1100 may include multiple client devices 1106, survey systems 902, and networks 1104.

This disclosure contemplates any suitable network 1104. As an example and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client device 1106, and server device 1102 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example and not by way of limitation, a client device 1106 may include any of the computing devices discussed above in relation to FIG. 8. A client device 1106 may enable a network user at client device 1106 to access network 1104. A client device 1106 may enable its user to communicate with other users at other client systems 1006.

In particular embodiments, client device 1106 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1106 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 1106 one or more Hyper Text Markup Language (HTML) files responsive to the HTTP request. Client device 1106 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1102 may include a variety of servers, sub-systems, programs, modules, logs, and data stores. In particular embodiments, server device 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1102 may also include suitable components such as network interfaces, security mechanisms, load balancers, failover servers, management-and-network-operations consoles, other suitable components, or any suitable combination thereof.

In particular embodiments, server device 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
    binding a document model for an electronic document to a plurality of document views;
    providing, to a first client device, a visual identifier associated with the electronic document for display within a graphical user interface on the first client device;
    receiving, from a second client device, an indication that the second client device scanned the visual identifier displayed within the graphical user interface on the first client device; and
    based on receiving the indication, providing the electronic document to the second client device, wherein providing the electronic document to the second client device causes the second client device to present, via a graphical user interface of the second client device, the electronic document in accordance with a first document view of the plurality of document views, the first document view comprising a first layout format corresponding to a first type of manipulation of survey content of the electronic document that is different from a second layout format corresponding to a second type of manipulation of the survey content of the electronic document corresponding to a second document view from the plurality of document views.

2. The method of claim 1, wherein the first document view is based on one or more display capabilities of the second client device.

3. The method of claim 1, wherein:
    the first client device is a desktop computer; and
    the second client device is one of either a tablet or a mobile phone.

4. The method of claim 1, further comprising:
identifying a client device type of the second client device; and
selecting the first document view from the plurality of document views based on the client device type.

5. The method of claim 1, wherein providing, to the first client device, the visual identifier associated with the electronic document comprises providing the visual identifier in conjunction with the electronic document.

6. The method of claim 5, further comprising:
receiving, from the second client device, user input with respect to the first document view;
generating an updated document model based on the user input; and
providing, to the first client device, an updated document view of the electronic document based on the updated document model that reflects the user input.

7. A system comprising:
at least one processor; and
a non-transitory computer readable storage medium storing instructions thereon that, when executed by the at least one processor, cause the system to:
bind a document model for an electronic document to a plurality of document views;
provide, to a first client device, a visual identifier associated with the electronic document for display within a graphical user interface on the first client device;
receive, from a second client device, an indication that the second client device scanned the visual identifier displayed within the graphical user interface on the first client device; and
based on receiving the indication, provide the electronic document to the second client device, wherein providing the electronic document to the second client device causes the second client device to present, via a graphical user interface of the second client device, the electronic document in accordance with a first document view of the plurality of document views, the first document view comprising a first layout format corresponding to a first type of manipulation of survey content of the electronic document that is different from a second layout format corresponding to a second type of manipulation of the survey content of the electronic document corresponding to a second document view from the plurality of document views.

8. The system of claim 7, wherein:
the second client device is a mobile computing device; and
the first document view is based on one or more display capabilities of the mobile computing device.

9. The system of claim 7, wherein:
the first client device is a desktop computer; and
the second client device is one of either a tablet or a mobile phone.

10. The system of claim 7, further comprising instructions that, when executed by the at least one processor, further cause the system to:
identify a client device type of the second client device; and
select the first document view from the plurality of document views based on the client device type.

11. The system of claim 7, wherein providing, to the first client device, the visual identifier associated with the electronic document comprises providing the visual identifier in conjunction with the electronic document.

12. The system of claim 11, further comprising instructions that, when executed by the at least one processor, further cause the system to:
receive, from the second client device, user input with respect to the first document view;
generate an updated document model based on the user input; and
provide, to the first client device, an updated document view of the electronic document based on the updated document model that reflects the user input.

13. The system of claim 12, wherein:
the electronic document is a digital survey question; and
the user input is a response to the digital survey question.

14. A non-transitory computer readable medium storing instructions thereon that, when executed by at least one processor, cause a computing device to:
bind a document model for an electronic document to a plurality of document views;
provide, to a first client device, a visual identifier associated with the electronic document for display within a graphical user interface on the first client device;
receive, from a second client device, an indication that the second client device scanned the visual identifier displayed within the graphical user interface on the first client device; and
based on receiving the indication, provide the electronic document to the second client device, wherein providing the electronic document to the second client device causes the second client device to present, via a graphical user interface of the second client device, the electronic document in accordance with a first document view of the plurality of document views, the first document view comprising a first layout format corresponding to a first type of manipulation of survey content of the electronic document that is different from a second layout format corresponding to a second type of manipulation of the survey content of the electronic document corresponding to a second document view from the plurality of document views.

15. The non-transitory computer readable medium of claim 14, wherein:
the second client device is a mobile computing device; and
the first document view is based on one or more display capabilities of the mobile computing device.

16. The non-transitory computer readable medium of claim 14, wherein:
the first client device is a desktop computer; and
the second client device is one of either a tablet or a mobile phone.

17. The non-transitory computer readable medium of claim 14, further comprising instructions that, when executed by the at least one processor, cause the computing device to:
identify a client device type of the second client device; and
select the first document view from the plurality of document views based on the client device type.

18. The non-transitory computer readable medium of claim 14, wherein providing, to the first client device, the visual identifier associated with the electronic document comprises providing the visual identifier in conjunction with the electronic document.

19. The non-transitory computer readable medium of claim 18, further comprising instructions that, when executed by the at least one processor, cause the computing device to:

receive, from the second client device, user input with respect to the first document view;

generate an updated document model based on the user input; and provide, to the first client device, an updated document view of the electronic document based on the updated document model that reflects the user input.

20. The non-transitory computer readable medium of claim 19, wherein:

the electronic document is a digital survey question; and
the user input is a response to the digital survey question.

* * * * *